United States Patent
Kaliyamoorthy et al.

(10) Patent No.: US 11,411,864 B1
(45) Date of Patent: Aug. 9, 2022

(54) ASYMMETRIC TO SYMMETRIC IRB MIGRATION SYSTEM

(71) Applicant: Dell Products L.P., Round Rock, TX (US)

(72) Inventors: Karthi Kaliyamoorthy, Chengalpattu (IN); Sathish Kumar Thanneerkulam Ravichandran, Chennai (IN); Karthik Krishnamurthy, Chennai (IN); Damodharan Sreenivasagaperumal, Chennai (IN)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 17/152,908

(22) Filed: Jan. 20, 2021

(51) Int. Cl.
| | |
|---|---|
| *G06F 15/16* | (2006.01) |
| *H04L 45/00* | (2022.01) |
| *H04L 45/586* | (2022.01) |
| *H04L 12/46* | (2006.01) |
| *H04L 45/24* | (2022.01) |
| *H04L 101/622* | (2022.01) |

(52) U.S. Cl.
CPC .......... *H04L 45/34* (2013.01); *H04L 12/4633* (2013.01); *H04L 45/22* (2013.01); *H04L 45/245* (2013.01); *H04L 45/586* (2013.01); *H04L 61/6022* (2013.01)

(58) Field of Classification Search
CPC ..... H04L 45/22; H04L 45/245; H04L 45/586; H04L 61/6022
See application file for complete search history.

(56) References Cited

U.S. PATENT DOCUMENTS

| | | | | |
|---|---|---|---|---|
| 2017/0171057 | A1* | 6/2017 | Dong | H04L 45/02 |
| 2018/0309691 | A1* | 10/2018 | Malhotra | H04L 47/34 |
| 2020/0204480 | A1* | 6/2020 | Lo | H04L 61/2038 |
| 2020/0322268 | A1* | 10/2020 | Thoria | H04L 12/4675 |
| 2021/0392069 | A1* | 12/2021 | Thoria | H04L 45/04 |

* cited by examiner

Primary Examiner — Hieu T Hoang
(74) Attorney, Agent, or Firm — Joseph Mencher

(57) ABSTRACT

An asymmetric/symmetric IRB migration system includes an aggregated networking device subsystem with a first and second networking device that are both configured to operate according to an asymmetric IRB model. A migration system coupled to the aggregated networking device subsystem retrieves first and second asymmetric IRB attributes from the first and second networking devices, uses the first asymmetric IRB attributes to generate first symmetric IRB attributes for the first networking device, and uses the second asymmetric IRB attributes to generate second symmetric IRB attributes for the second networking device. The migration system then causes data destined for end host device(s) coupled to the aggregated networking device subsystem to be transmitted only to the first networking device, configures the first networking device using the first symmetric IRB attributes, and then configures the second networking device using the second symmetric IRB attributes.

20 Claims, 17 Drawing Sheets

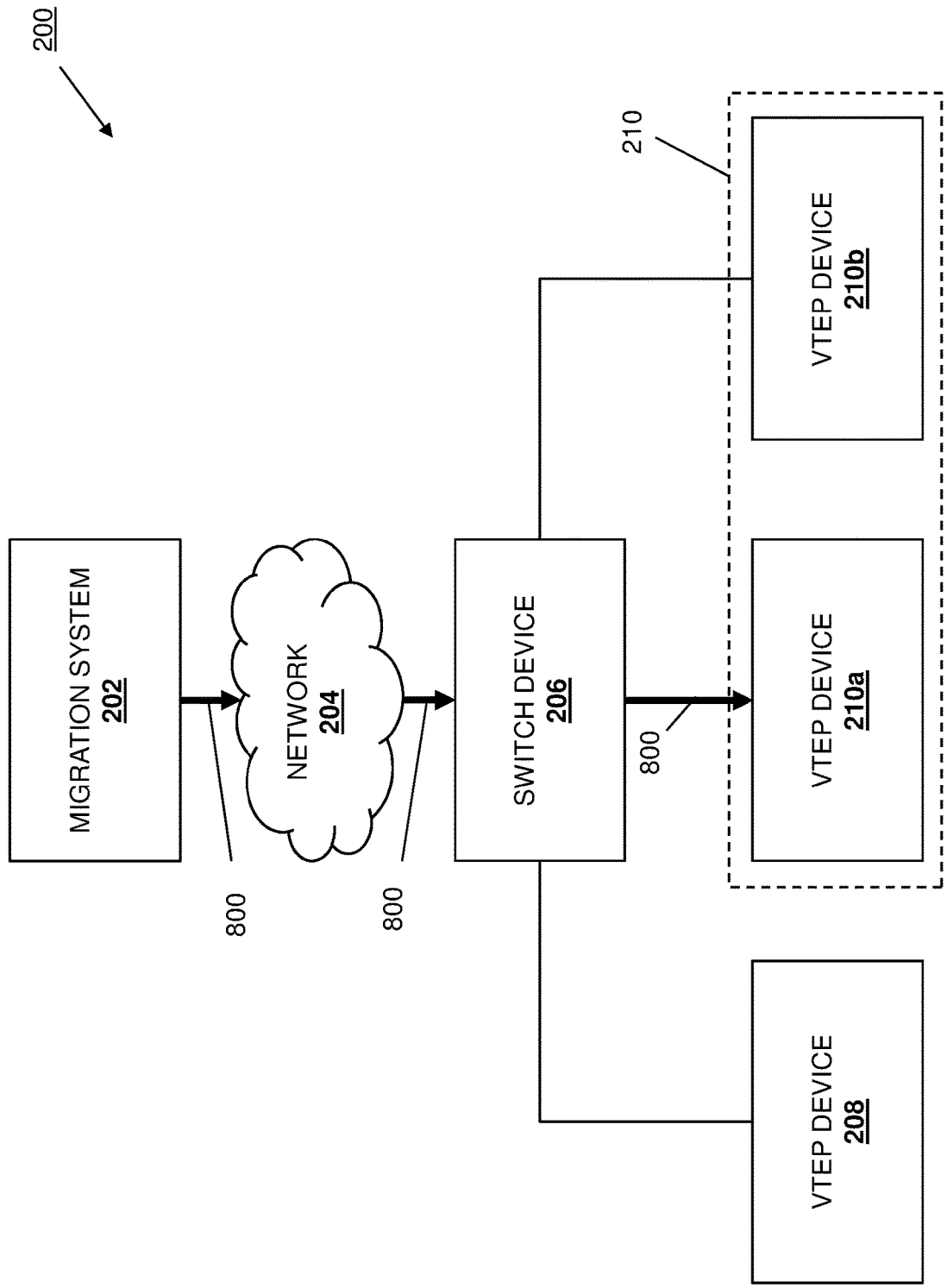

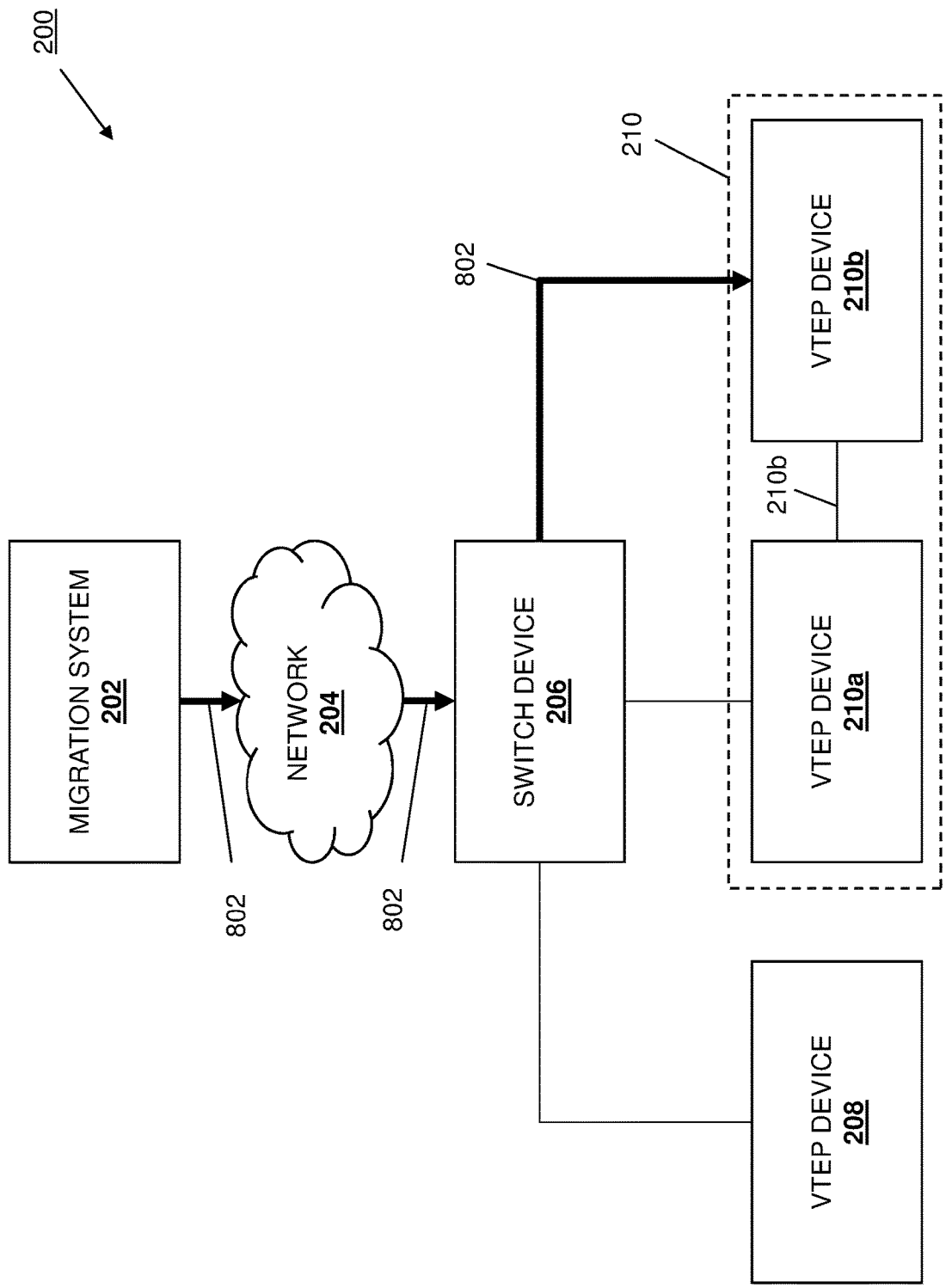

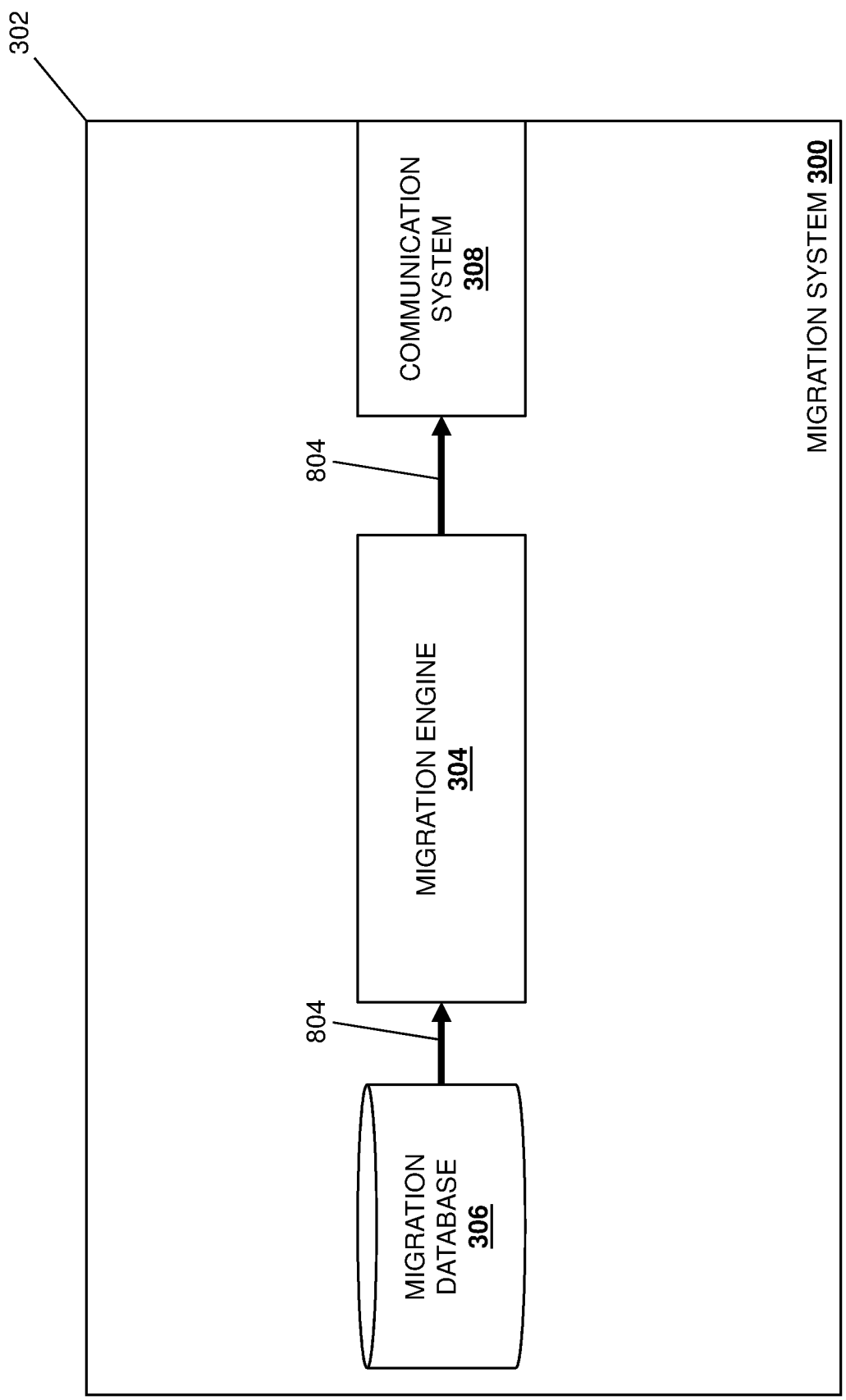

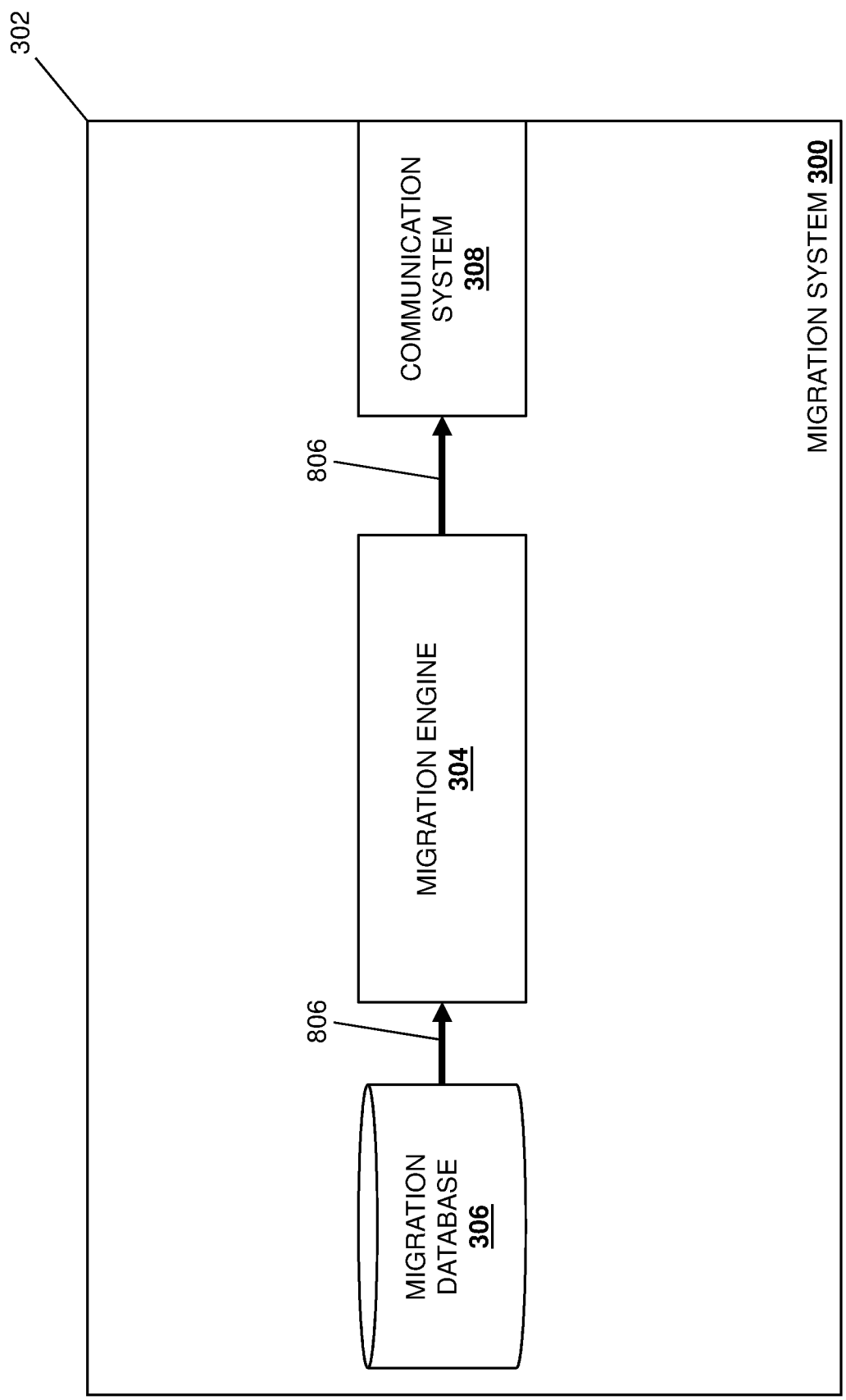

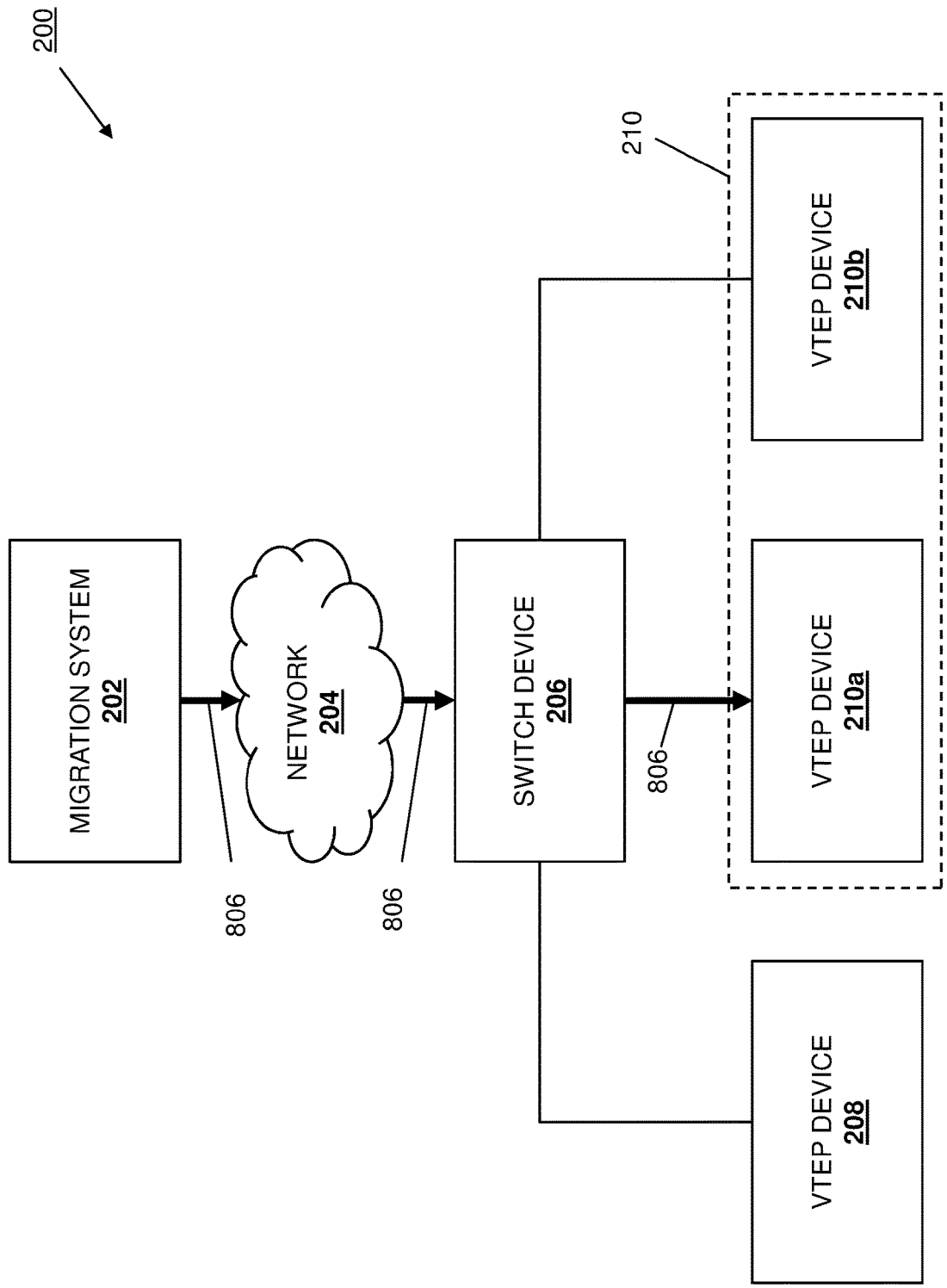

ASYMMETRIC TO SYMMETRIC IRB MIGRATION SYSTEM

BACKGROUND

The present disclosure relates generally to information handling systems, and more particularly to migrating information handling systems from an asymmetric Integrated Routing and Bridging (IRB) model to a symmetric IRB model.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, router devices, and/or other networking devices known in the art, may be provided in a datacenter and configured with Integrated Routing and Bridging (IRB) functionality in order to provide more optimal use of bandwidth, to provide more optimal forwarding, to reduce traffic tromboning, and/or provide other IRB benefits that would be apparent to one of skill in the art in possession of the present disclosure. For example, networking devices in a datacenter may be configured as Virtual eXtensible Local Area Network (VXLAN) Tunnel EndPoint (VTEP) nodes and provided with IRB functionality in order to allow routing operations to be performed as close to end host devices as possible. Two IRB models are currently available: an asymmetric IRB model and a symmetric IRB model. As will be appreciated by one of skill in the art in possession of the present disclosure, the symmetric IRB model addresses scaling issues with the asymmetric IRB model by, for example, only requiring VTEP nodes to be configured with information about locally connected end host devices (rather than being configured with all the end host devices in the datacenter to which it may be connected to as is required in the asymmetric IRB model), as well including other features that would be apparent to one of skill in the art in possession of the present disclosure.

Due to the efficiencies and/or scalability of the symmetric IRB, it may be desirable to migrate a datacenter from the asymmetric IRB model to symmetric IRB model. However, such asymmetric/symmetric IRB migration operations may cause issues, particular when performed on a relatively large datacenter. For example, consider a datacenter operating according to the asymmetric IRB model and including 128 Virtual Routing and Forwarding (VFR) instances, 128 VTEP nodes, and 8 spine switches. In order to migrate such a datacenter to the symmetric IRB model, a network administrator and/or other user will be required to manually allocate 128 unique Layer 3 (L3) Virtual Network Identifiers (VNIs), and configure those VNI's in all of the 128 VTEP nodes, which requires the VNI configuration operation to be performed (128×128=) 16,384 times. Furthermore, the asymmetric/symmetric IRB migration would also require the network administrator and/or other user to manually provide unique router Media Access Control (MAC) addresses for all 128 VTEPs, which requires the router MAC address provisioning operations to be performed 128 times. Further still, the asymmetric/symmetric IRB migration would also require the network administrator and/or other user to manually configure and then unconfigure Border Gateway Protocol (BGP) Multi-Exit Discriminator (MED) attributes for all aggregated VTEP node pairs, which requires the BGP MED configuration/unconfiguration operations to be performed (64×8×2=) 1024 times. As such, conventional asymmetric/symmetric IRB migration operations are a time-consuming and error-prone, and can lead to data losses when performed incorrectly.

Accordingly, it would be desirable to provide an asymmetric/symmetric IRB migration system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a migration engine that is configured to: retrieve first asymmetric Integrated Routing Bridging (IRB) attributes from a first networking device; retrieve second asymmetric IRB attributes from the second networking device that is aggregated with the first networking device to provide an aggregated networking device subsystem; generate, using the first asymmetric IRB attributes, first symmetric IRB attributes for the first networking device; generate, using the second asymmetric IRB attributes, second symmetric IRB attributes for the second networking device; cause data destined for at least one end host device that is coupled to the aggregated networking device subsystem to be transmitted only to the first networking device; configure the first networking device using the first symmetric IRB attributes; and configure, subsequent to configuring the first networking device using the first symmetric IRB attributes, the second networking device using the second symmetric IRB attributes.

BRIEF DESCRIPTION OF THE DRAWINGS

FIG. 8B is a schematic view illustrating an embodiment of the networked system of FIG. 2 operating during the method of FIG. 4.

FIG. 8D is a schematic view illustrating an embodiment of the networked system of FIG. 2 operating during the method of FIG. 4.

FIG. 8E is a schematic view illustrating an embodiment of the migration system of FIG. 3 operating during the method of FIG. 4.

FIG. 8G is a schematic view illustrating an embodiment of the migration system of FIG. 3 operating during the method of FIG. 4.

FIG. 8H is a schematic view illustrating an embodiment of the networked system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
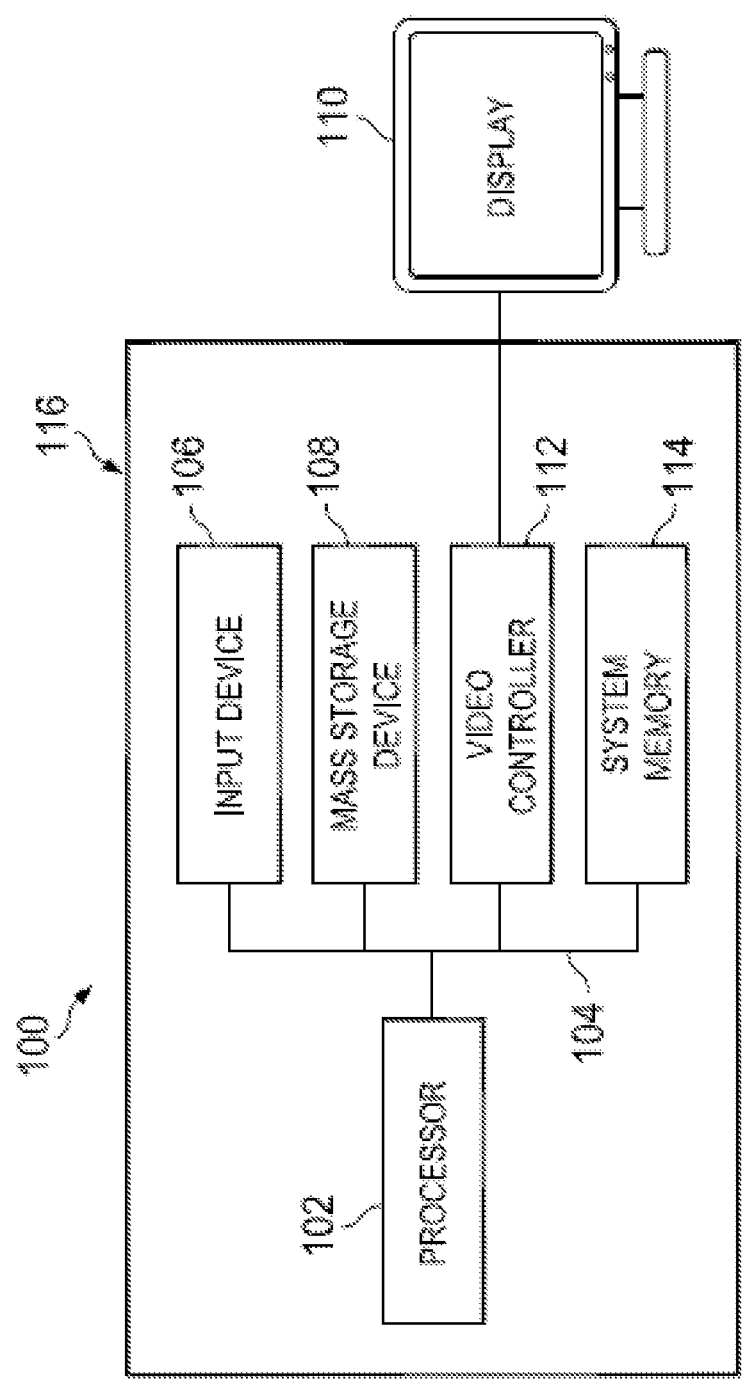
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
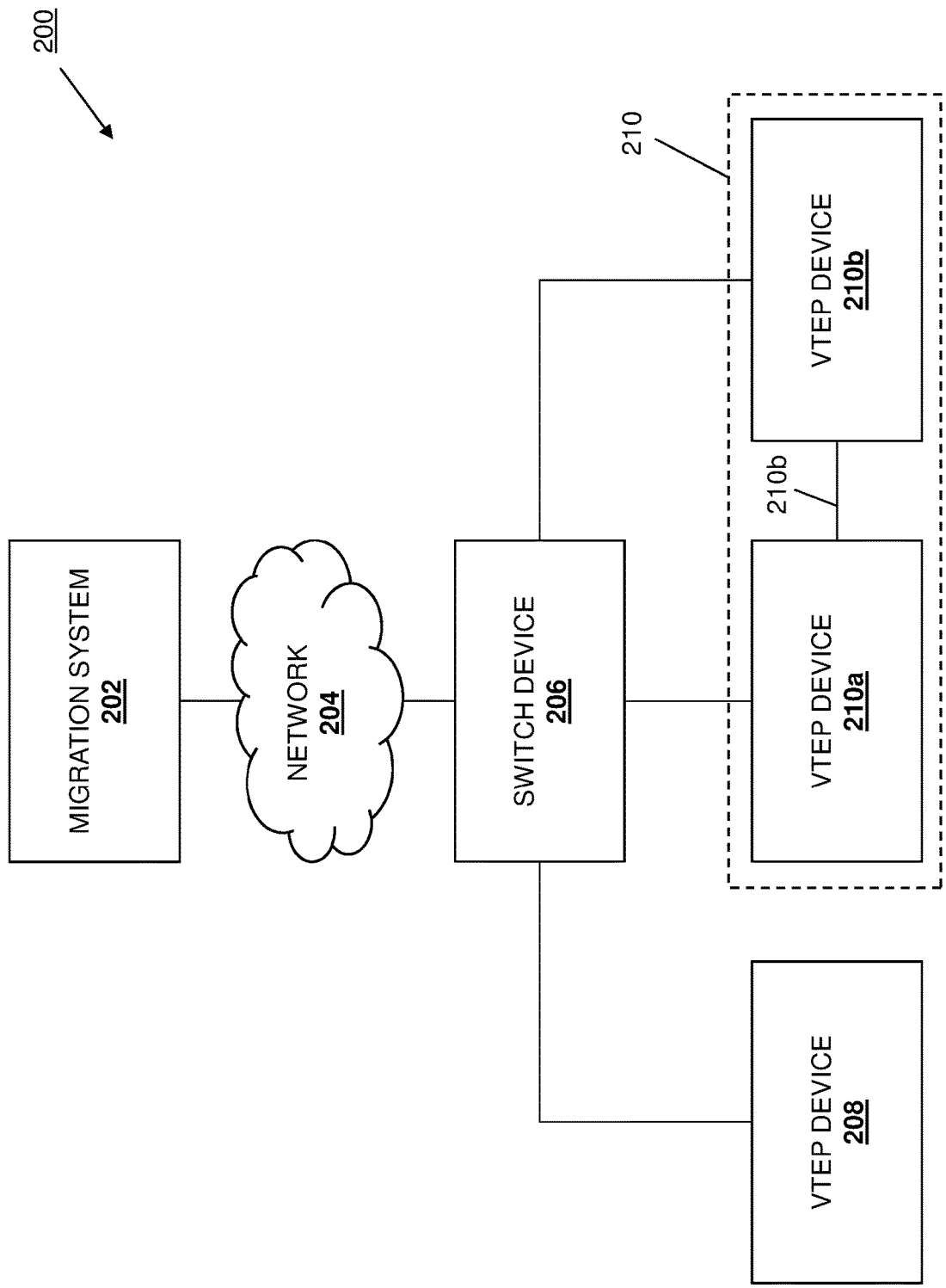
FIG. 2 is a schematic view illustrating an embodiment of a networked system that may be migrated from an asymmetric IRB model to a symmetric IRB model according to the teachings of the present disclosure.

Referring now to FIG. 2, an embodiment of a networked system 200 is illustrated that may be migrated from an asymmetric IRB model to a symmetric IRB model according to the teachings of the present disclosure. In the illustrated embodiment, the networked system 200 includes a migration system 202. In an embodiment, the migration system 202 may be provided by the IHS 100 discussed above with reference to FIG. 1, and/or may include some or all of the components of the IHS 100, and in different embodiments may be provided by one or more networking devices, server devices, desktop computing devices, laptop/notebook computing devices, and/or a variety of other computing devices that would be apparent to one of skill in the art in possession of the present disclosure. In specific examples, the migration system 202 may be provided using an external networking fabric controller provided by a networking device (e.g., one of the networking devices discussed below), using a cluster master device, and/or in a variety of other manners that would be apparent to one of skill in the art in possession of the present disclosure. However, while illustrated and discussed as being provided by specific device(s), one of skill in the art in possession of the present disclosure will recognize that the migration functionality provided in the networked system 200 may be provided using any devices that may be configured to operate similarly as the migration system 202 discussed below.

In the illustrated embodiment, the migration system 202 is coupled to a network 204 that may be provided by a Local Area Network (LAN), the Internet, combinations thereof, and/or any other network that would be apparent to one of skill in the art in possession of the present disclosure. Furthermore, the examples below illustrate a switch device 206 that is coupled to the network 204. In an embodiment, the switch device 206 may be provided by the IHS 100 discussed above with reference to FIG. 1, and/or may include some or all of the components of the IHS 100, and in the specific examples below is discussed as being provided by a spine switch device. However, while illustrated and discussed as being provided by a spine switch device, one of skill in the art in possession of the present disclosure will recognize that switch devices provided in the networked system 200 may be provided using other networking devices that may be configured to operate similarly as the switch device discussed below.

Further still, a plurality of networking devices may be coupled to the switch device 206 and configured to operate as leaf switch devices that provide Virtual eXtensible Local Area Network (VXLAN) Tunnel EndPoint (VTEP) devices, with the illustrated example providing a "standalone" VTEP device 208 coupled to the switch device 206, and an aggregated networking device subsystem 210 that includes a first networking device providing a VTEP device 210a, and a second networking device providing a VTEP device 210b, each of which are coupled to the switch device 206 and to each other. In a specific example, the aggregated networking device subsystem 210 may be aggregated using the Virtual Link Trunking (VLT) protocol to provide the first networking device as a first VLT VTEP device 210a, and the second networking device as a second VLT VTEP device 210b, with the first VLT VTEP device 210a and the second VLT VTEP device 210b directly connected to each other by one or more Inter-Chassis Links (ICLs) 210b. However, while the aggregated networking device subsystem 210 is illustrated and described as being aggregated using a particular aggregation protocol, one of skill in the art in possession of the present disclosure will appreciate that networking devices may be aggregated using different aggregation protocols while remaining within the scope of the present disclosure as well.

Furthermore, while only a single switch device 206 connected to VTEP devices 208, 210a, and 210b is illustrated and described in the examples below, one of skill in the art in possession of the present disclosure will recognize that many more VTEP devices may (and typically will) be coupled to many more switch devices (e.g., in a datacenter) while remaining within the scope of the present disclosure. For example, the networked system 200 may include multiple standalone VTEP devices and/or multiple aggregated networking device subsystems while remaining within the scope of the present disclosure. In a specific example, as discussed above, a relatively large datacenter may include 128 VTEP devices (with 128 Virtual Routing and Forwarding (VFR) instances) coupled to 8 spine switch devices, and one of skill in the art in possession of the present disclosure will appreciate that larger or smaller datacenters may be migrated from an asymmetrical IRB model to a symmetrical IRB model according to the teachings of the present disclosure while remaining within its scope as well. However, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
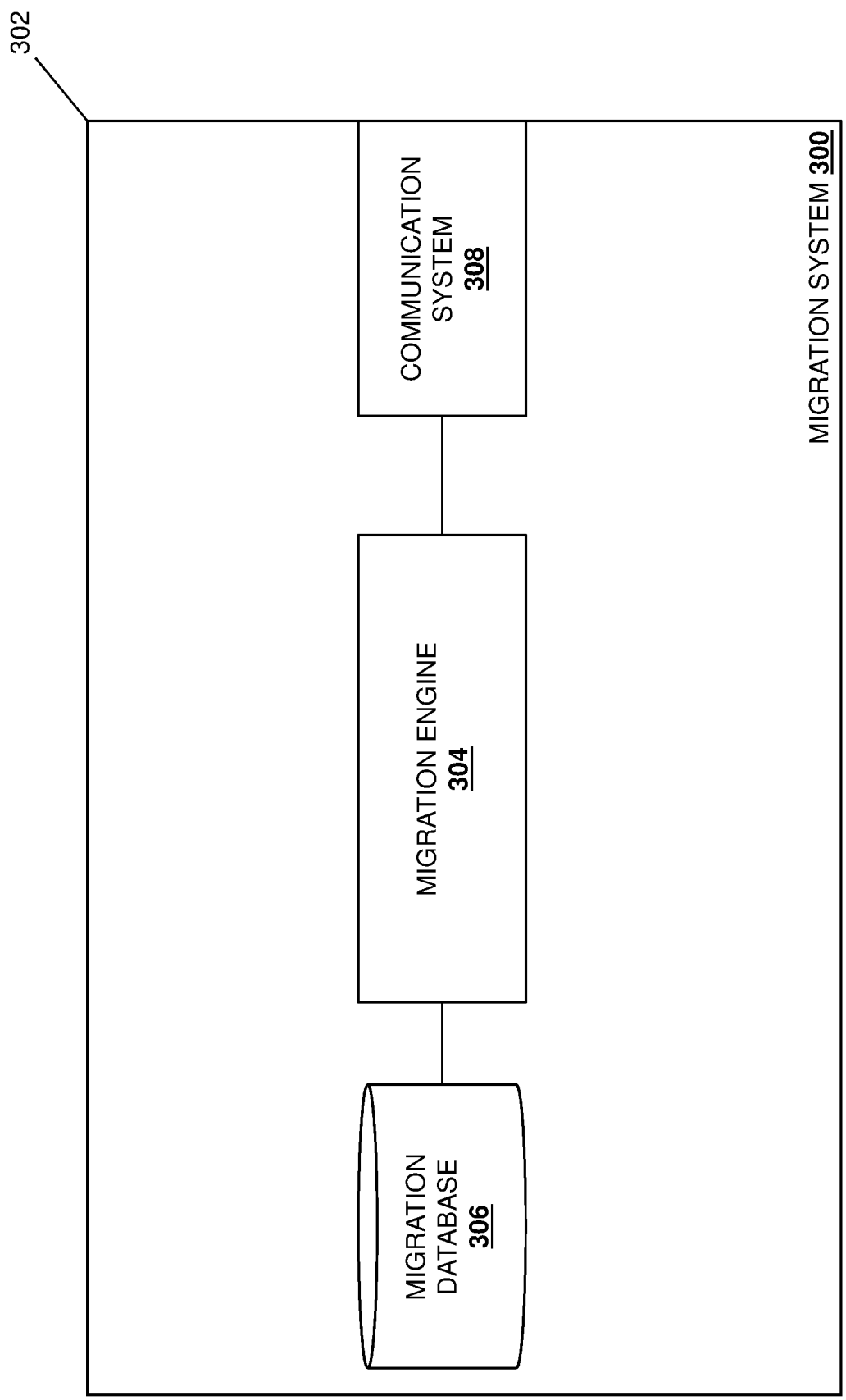
FIG. 3 is a schematic view illustrating an embodiment of a migration system that may be included in the networked system of FIG. 2 and that may provide the asymmetric/symmetric IRB migration functionality of the present disclosure.

Referring now to FIG. 3, an embodiment of a migration system 300 is illustrated that may provide the migration system 202 discussed above with reference to FIG. 2. As such, the migration system 300 may be provided by the IHS 100 discussed above with reference to FIG. 1 and/or may include some or all of the components of the IHS 100, and in specific examples may be provided using an external networking fabric controller provided by a networking device (e.g., one of the networking devices in the networked system 200 discussed above), using a cluster master device, and/or in a variety of other manners that would be apparent to one of skill in the art in possession of the present disclosure. However, while illustrated and discussed as being provided by specific device(s), one of skill in the art in possession of the present disclosure will recognize that the migration system 300 may be provided using any devices that may be configured to operate similarly as the migration system 300 discussed below. In the illustrated embodiment, the migration system 300 includes a chassis 302 that houses the components of the migration system 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a migration engine 304 that is configured to perform the functionality of the migration engines and/or migration systems discussed below.

The chassis 302 may also house a storage system (not illustrated, but which may include the storage 108 discussed above with reference to FIG. 1) that is coupled to the migration engine 304 (e.g., via a coupling between the storage system and the processing system) and that includes a migration database 306 that is configured to store any of the information utilized by the migration engine 304 discussed below. The chassis 302 may also house a communication system 308 that is coupled to the migration engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific migration system 300 has been illustrated, one of skill in the art in possession of the present disclosure will recognize that migration systems (or other devices operating according to the teachings of the present disclosure in a manner similar to that described below for the migration system 300) may include a variety of components and/or component configurations for providing conventional functionality, as well as the migration functionality discussed below, while remaining within the scope of the present disclosure as well.

Figure 4:
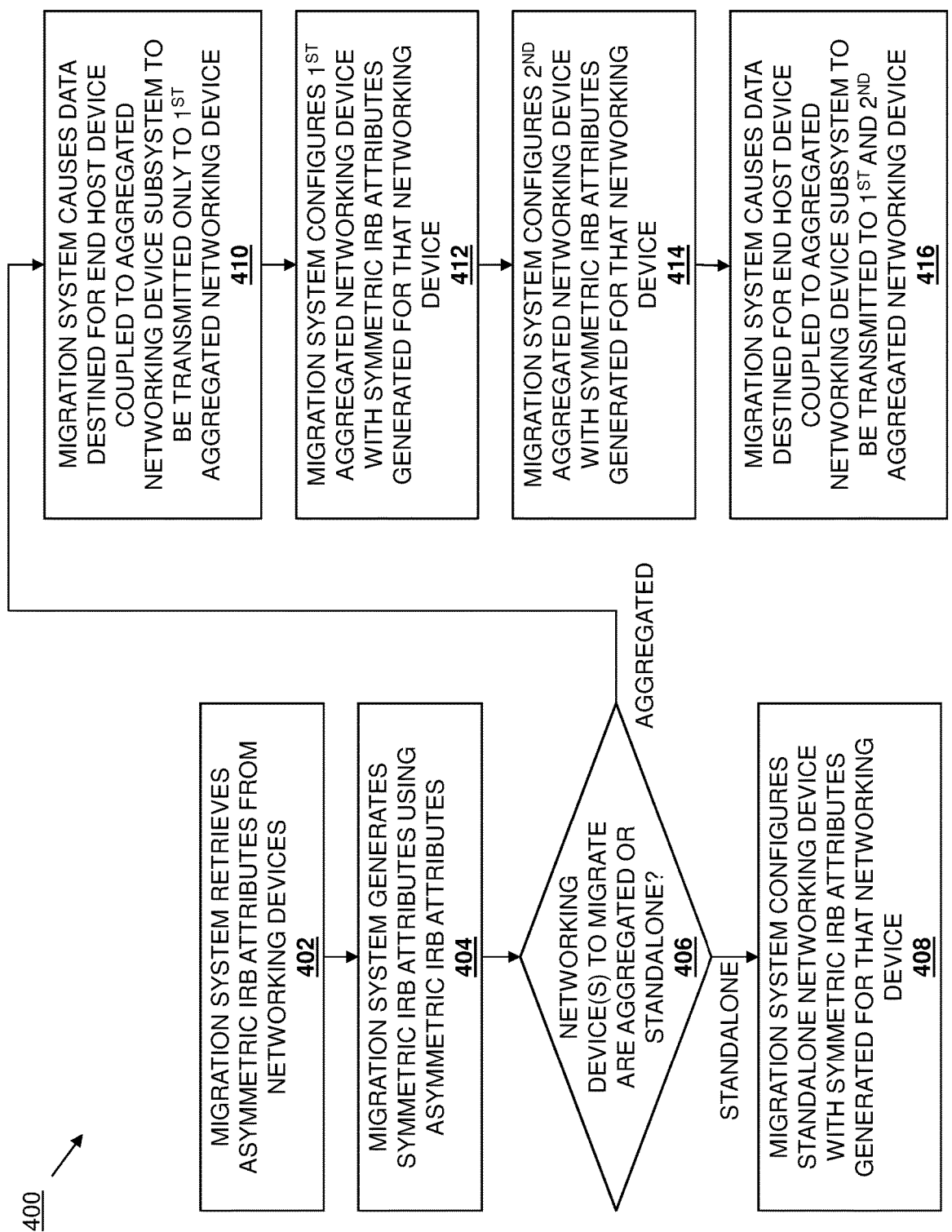
FIG. 4 is a flow chart illustrating an embodiment of a method for migrating a datacenter from an asymmetric IRB model to a symmetric IRB model.

Referring now to FIG. 4, an embodiment of a method 400 for migrating from an asymmetric IRB model to a symmetric IRB model is illustrated. As discussed below, the systems and methods of the present disclosure provide for the automated generation of symmetric IRB attributes for networking devices in a datacenter using asymmetric IRB attributes retrieved from those networking devices, along with the use of those symmetric IRB attributes to sequentially configure networking devices that are aggregated as part of an aggregated networking device subsystem while data traffic is directed to only one of those networking devices, which operates to migrate the datacenter from an asymmetric IRB model to a symmetric IRB model. For example, the asymmetric/symmetric IRB migration system of the present disclosure may include an aggregated networking device subsystem with a first and second networking device that are both configured to operate according to an asymmetric IRB model. A migration system coupled to the aggregated networking device subsystem retrieves first and second asymmetric IRB attributes from the first and second networking devices, uses the first asymmetric IRB attributes to generate first symmetric IRB attributes for the first networking device, and uses the second asymmetric IRB attributes to generate second symmetric IRB attributes for the second networking device. The migration system then causes data destined for end host device(s) coupled to the aggregated networking device subsystem to be transmitted only to the first networking device, configures the first networking device using the first symmetric IRB attributes, and then configures the second networking device using the second symmetric IRB attributes. As such, the migration of datacenters from an asymmetric IRB model to a symmetric IRB model is automated, reducing the manual, time-consuming, and error prone operations required in conventional asymmetric/symmetric IRB migration systems.

The method 400 begins at block 402 where a migration system retrieves asymmetric IRB attributes from networking devices. In an embodiment, prior to the method 400, the networked system 200 may have been configured according to an asymmetric Integrated Routing and Bridging (IRB) model such that each of the VTEP devices 208, 210a, and 210b in the networked system 200 includes a plurality of asymmetric IRB attributes such as, for example, at least one Virtual Routing and Forwarding (VRF) instance associated with each of those VTEP devices, at least one tunnel source Internet Protocol (IP) address associated with each of those VTEP devices, at least one Border Gateway Protocol (BGP) underlay switch neighbor (e.g., the switch device 206) associated with each of those VTEP devices, and at least one first BGP Autonomous System (AS) associated with each of those VTEP devices. However, while specific examples are provided of asymmetric IRB attributes that may be included in VTEP devices configured according to an asymmetric IRB model, one of skill in the art in possession of the present disclosure will appreciate that VTEP devices and/or other networking devices may include a variety of asymmetric IRB attributes when configured as part of an asymmetric IRB model while remaining within the scope of the present disclosure as well. As such, the networking system 200 including the switch device 206 and VTEP devices 208, 210a, and 210b may be configured to operate according to the asymmetric IRB model prior to the method 400, and as discussed above the networked system 200 may (and typically will) include many more switch devices (e.g., spine switch devices) and VTEP devices (e.g., standalone VTEP devices and/or aggregated VTEP devices) that are also configured to operate according to the asymmetric IRB model as well.

In an embodiment, at block 402, the migration engine 304 in the migration system 202/300 may operate to retrieve asymmetric IRB attributes from each of the VTEP devices 208, 210a, and 210b. For example, at block 402, a network administrator or other user may choose to migrate the networked system 200 from the asymmetric IRB model to a symmetric IRB model and, in response, may utilize the migration engine 304 in the migration system 304 to begin an asymmetric/symmetric migration process. In a specific example, the network administrator or other user may instruct the migration engine 304 to migrate the networked system 200 from the asymmetric IRB model to the symmetric IRB model, and may identify VTEP device access information (e.g., a management IP address), types of each VTEP device (e.g., "standalone", "aggregated") in the networked system 200, a Layer 3 (L3) Virtual eXtensible Local Area Network (VXLAN) Network Identifier (VNI) offset, a EVPN router MAC address offset, and/or any other information to the migration engine 304 that one of skill in the art in possession of the present disclosure will recognize would allow for the asymmetric/symmetric IRB migration functionality discussed below. However, while a network administrator or other user has been described as identifying VTEP device access information, the types of each VTEP device in the networked system 200, an L3 VNI offset, and an EVPN router MAC address offset, one of skill in the art in possession of the present disclosure will appreciate that such information may be retrieved by the migration engine 304 in the migration system 202/300 from a database at block 402 while remaining within the scope of the present disclosure as well.

Figure 5A:
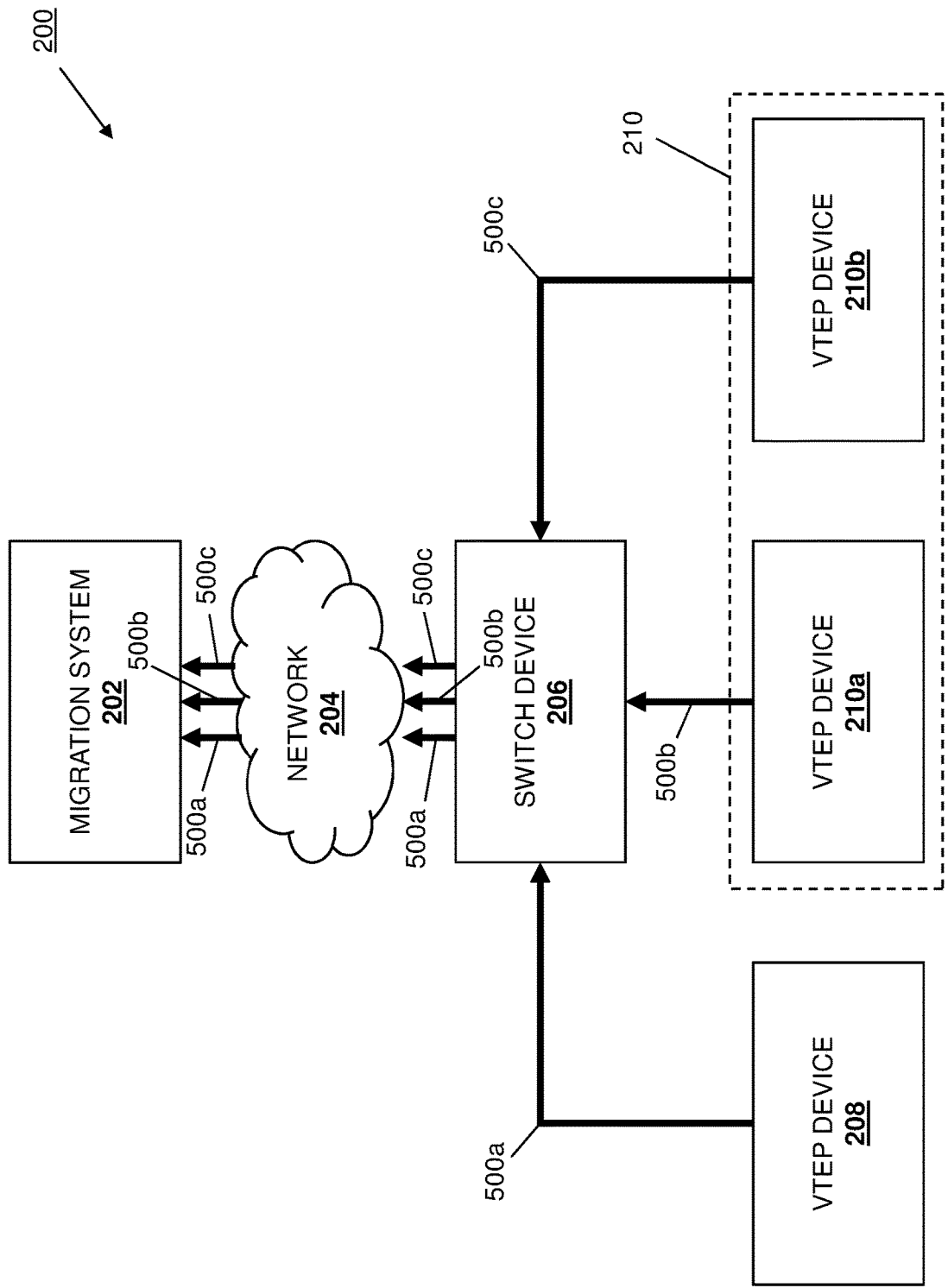
FIG. 5A is a schematic view illustrating an embodiment of the networked system of FIG. 2 operating during the method of FIG. 4.
Figure 5B:
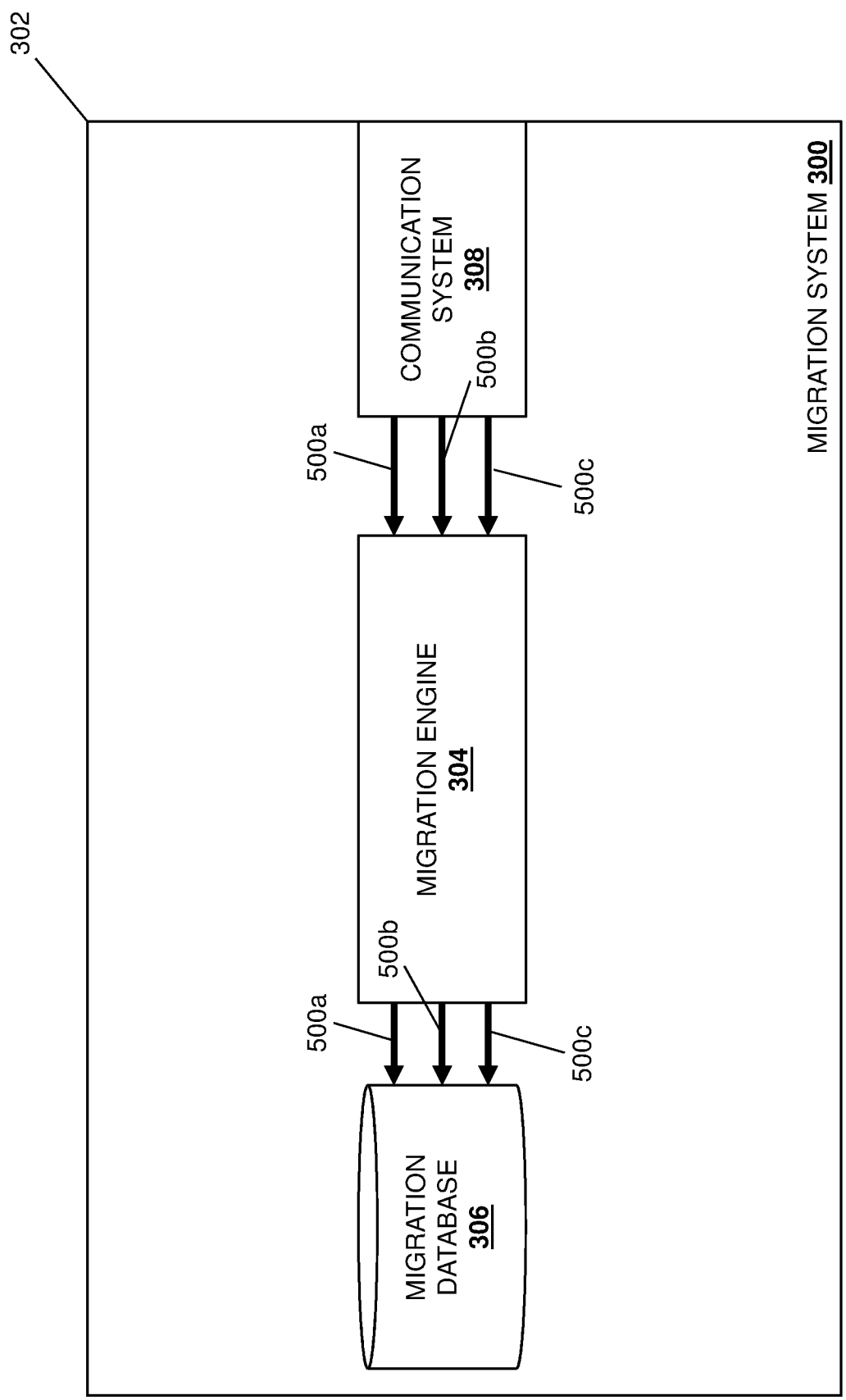
FIG. 5B is a schematic view illustrating an embodiment of the migration system of FIG. 3 operating during the method of FIG. 4.

As illustrated in FIGS. 5A and 5B, in response to receiving instruction to migrate the networked system 200 from the asymmetric IRB model to the symmetric IRB model, the migration engine 304 in the migration system 202/300 may perform asymmetric IRB attribute retrieval operations 500a that include retrieving (via its communication system 308) asymmetric IRB attributes from the VTEP device 208 and storing them in its migration database 306, performing asymmetric IRB attribute retrieval operations 500b that include retrieving (via its communication system 308) asymmetric IRB attributes from the VTEP device 210a and storing them in its migration database 306, and performing asymmetric IRB attribute retrieval operations 500c that include retrieving (via its communication system 308) asymmetric IRB attributes from the VTEP device 210c and storing them in its migration database 306. Furthermore, one of skill in the art in possession of the present disclosure will appreciate how the migration engine 304 in the migration system 202/300 may perform similar asymmetric IRB attribute retrieval operations to retrieve and store asymmetric IRB attributes from any other VTEP device in the networked system 200 as well.

Continuing with the specific example provided above, the asymmetric IRB attributes retrieved from the VTEP devices 208, 210a, and 210b (and/or any other VTEP devices in the networked system 200) may include at least one VRF instance associated with each of those VTEP devices, at least one tunnel source IP address associated with each of those VTEP devices, at least one BGP underlay switch neighbor (e.g., the switch device 206) associated with each of those VTEP devices, and at least one first BGP AS associated with each of those VTEP devices. However, while specific examples are provided of asymmetric IRB attributes that may be retrieved from VTEP devices configured according to an asymmetric IRB model, one of skill in the art in possession of the present disclosure will appreciate that other asymmetric IRB attributes may be retrieved from VTEP devices and/or other networking devices while remaining within the scope of the present disclosure as well.

In an embodiment, the retrieval of the asymmetric IRB attributes from the VTEP devices 208, 210a, and 210b (and/or any other VTEP devices in the networked system 200) at block 402 may be performed by the migration engine 304 in the migration system 202/300 by retrieving an asymmetric running configuration from each of those VTEP devices using, for example, a management IP address provided for those VTEP devices (e.g., which may have been identified by the network administrator or other user to the migration engine 304 as discussed above). In a specific example, the retrieval of the asymmetric running configurations from VTEP devices may be accomplished using a Representational State Transfer (REST) Application Programming Interface (API), an ANSIBLE® playbook, and/or other configuration retrieval tools that would be apparent to one of skill in the art in possession of the present disclosure. For example, the following command may be utilized to retrieve the asymmetric running configurations from VTEP devices:

copy running-configuring tftp://hostip/filepath

In an embodiment, an asymmetric running configuration retrieved from a VTEP device may include the following:
   Interface virtual-network200
   no shutdown
   ip vrf forwarding evpn-one
   ip address 200.1.1.10/24
   ip virtual-router address 200.1.1.100
   ipv6 address 200::10/64
   ipv6 virtual-router address 200::100

As will be appreciated by one of skill in the art in possession of the present disclosure, at block 404 the migration engine 304 in the migration system 202/300 may identify asymmetric IRB attributes in the running configuration retrieved from the VTEP device such as, for example, a virtual network (e.g., "virtual-network200" in the example above), as well as a corresponding VRF instance (e.g., "evpn-one" in the example above).

Furthermore, an asymmetric running configuration retrieved from a VTEP device may include the following:
   nve
   source-interface loopback0
   . . .
   Interface loopback0
   no shutdown
   ip address 90.90.90.90/32
   !

As will be appreciated by one of skill in the art in possession of the present disclosure, at block 404 the migration engine 304 in the migration system 202/300 may identify asymmetric IRB attributes in the running configuration retrieved from the VTEP device such as, for example, a VTEP IP address (e.g., "90.90.90.90/32" in the example above).

Further still, an asymmetric running configuration retrieved from a VTEP device may include the following:
   router bgp 200
   neighbor 34.34.34.34

As will be appreciated by one of skill in the art in possession of the present disclosure, at block 404 the migration engine 304 in the migration system 202/300 may identify asymmetric IRB attributes in the running configuration retrieved from the VTEP device such as, for example, a BGP AS number (e.g., "200" in the example above), along with a neighbor IP address (e.g., "34.34.34.34" in the example above).

Further still, an asymmetric running configuration retrieved from a VTEP device may include the following:
   Interface ethernet1/1/1
   no shutdown
   no switchport
   ip address 34.34.34.34/24
   flowcontrol receive on As will be appreciated by one of skill in the art in possession of the present disclosure, at block 404 the migration engine 304 in the migration system 202/300 may identify asymmetric IRB attributes in the running configuration retrieved from the VTEP device such as, for example, a IP address of a spine switch device couple to the VTEP device (e.g., "34.34.34.34/24" in the example above). However, while a specific example of the retrieval of asymmetric IRB attributes from VTEP devices via their asymmetric running configurations is described above, one of skill in the art in possession of the present disclosure will appreciate that asymmetric IRB attributes may be retrieved from VTEP devices using a variety of techniques that will within the scope of the present disclosure as well.

Figure 6:
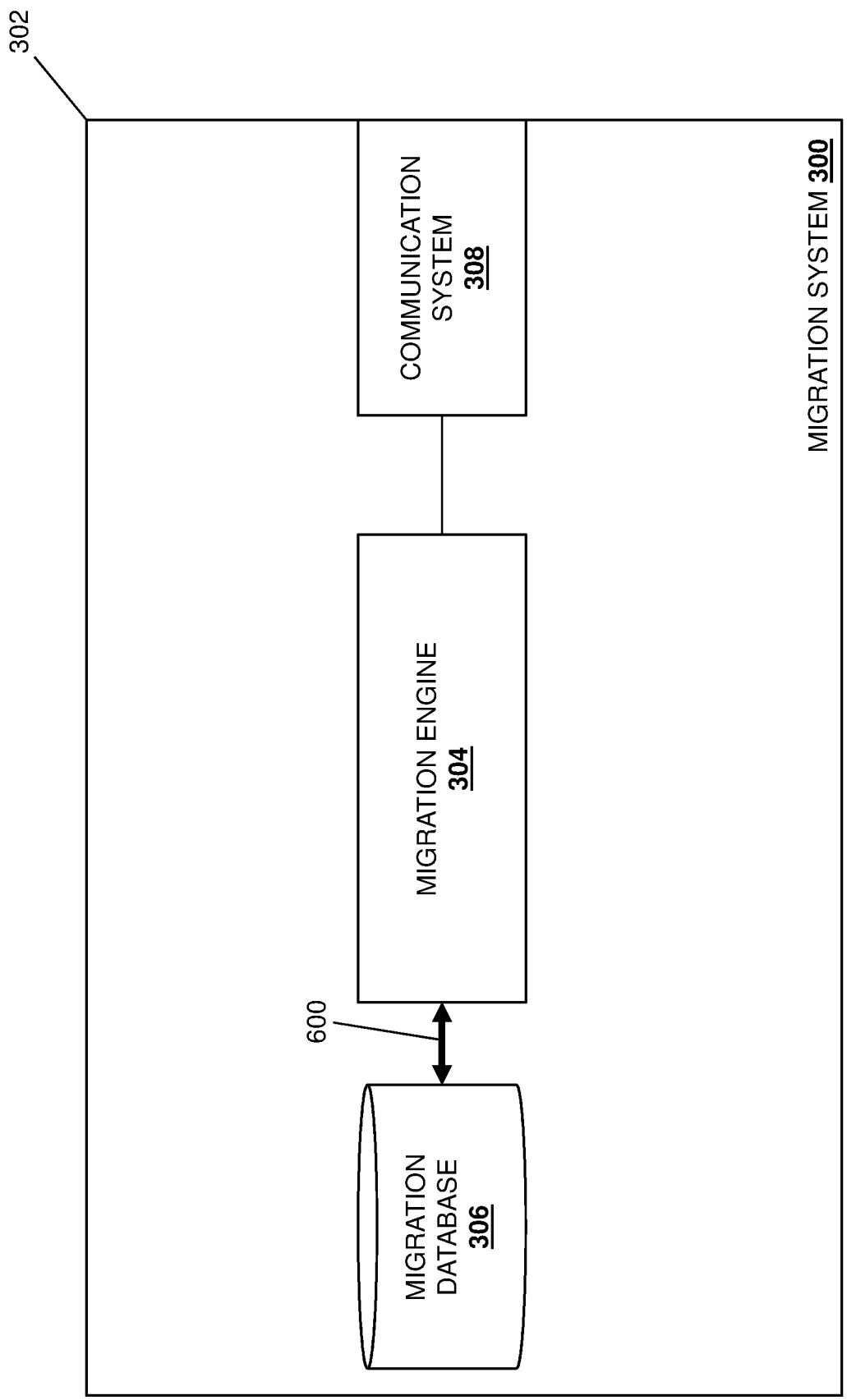
FIG. 6 is a schematic view illustrating an embodiment of the migration system of FIG. 3 operating during the method of FIG. 4.

The method 400 then proceeds to block 404 where the migration system generates symmetric IRB attributes using the asymmetric IRB attributes. As illustrated in FIG. 6, in an embodiment of block 404, the migration engine 304 in the migration system 202/300 may utilize the asymmetric IRB attributes retrieved from the VTEP devices 208, 210a, and 210b (and/or from any other VTEP devices in the networked system 200) at block 402 to perform symmetric IRB attribute generation operations 600 in order to generate symmetric IRB attributes for those VTEP devices. Continuing with the specific example above, at block 404, the migration engine 304 in the migration system 202/300 generate symmetric IRB attributes including a unique Layer 3 (L3) Virtual eXtensible Local Area Network (VXLAN) Network Identifier (VNI) for each VRF instance retrieved from each VTEP device, as well as a unique Ethernet Virtual Private Network (EVPN) router Media Access Control (MAC) address for VTEP devices that are aggregated in an aggregated networking device subsystem (e.g., the VTEP devices 210a and 210b). As will be appreciated by one of skill in the art in possession of the present disclosure, at block 404, a symmetric IRB model may then be generated for each "standalone" VTEP device in the networked system using the L3 VNIs, and a symmetric IRB model may be generated for each "aggregated" VTEP device in the networked system using the L3 VNIs and the EVPN router MAC addresses.

Continuing with the specific example of the asymmetric IRB attributes retrieved from the asymmetric running configurations discussed above, at block 404 the migration engine 304 in the migration system 202/300 may utilize those asymmetric IRB attributes to generate symmetric IRB attributes for the VTEP devices. For example, at block 404 the migration engine 304 in the migration system 202/300 may generate a unique L3 VNI for the VRF instance identified in each asymmetric running configuration, as illustrated in the example provided in the table below:

| VRF INSTANCES | L3 VNI |
| --- | --- |
| evpn-one | 5000 |
| evpn-two | 5001 |

The table above illustrates how a unique L3 VNI ("5000") was generated for the VRF instance ("evpn-one") identified in the example provided above of the asymmetric running configuration retrieved from a VTEP device, as well as how another unique L3 VNI ("5001") may be generated for a VRF instance ("evpn-two") identified in another asymmetric running configuration retrieved from another VTEP device, and one of skill in the art in possession of the present disclosure will appreciate how L3 VNI's may be generated for each VRF instance identified in a running configuration retrieved from each VTEP device in the networked system 200 while remaining within the scope of the present disclosure as well. The migration engine 304 in the migration system 202/300 may then provide the unique L3 VNI generated for each VRF instance, and router MAC address for each VTEP, for all "standalone" VTEP devices in a symmetric running configuration for that VTEP device.

In another example, at block 404 the migration engine 304 in the migration system 202/300 may generate a unique EVPN router MAC address for VLT devices that are aggregated as part of an aggregated networking device subsystem, as illustrated in the example provided in the table below:

| AGGREGATED NETWORKING DEVICE SUBSYSTEM | EVPN ROUTER MAC ADDRESS |
|---|---|
| 210 | 00:00:00:11:12:00 |
| XYZ | 00:00:00:11:12:01 |

The table above illustrates how a unique EVPN router MAC address ("00:00:00:11:12:00") was generated for the aggregated networking device subsystem 210, as well as how another unique EVPN router MAC address ("00:00:00:11:12:01") may be generated for another aggregated networking device subsystem (e.g., an aggregated networking device subsystem XYZ) in the networked system 200, and one of skill in the art in possession of the present disclosure will appreciate how unique EVPN router MAC addresses may be generated for each aggregated networking device subsystem in the networked system 200 while remaining within the scope of the present disclosure as well.

The migration engine 304 in the migration system 202/300 may then provide the unique EVPN router MAC address and the unique L3 VNI generated for each "aggregated" VTEP device in a symmetric running configuration for that VTEP device. An example of a symmetric running configuration for a VTEP device that includes the unique EVPN router MAC address and the unique L3 VNI generated for that VTEP device is provided below:

evpn
auto-evi
router-mac 00:00:00:11:12:00
!
vrf evpn-one
 vni 5000
 route-target auto As will be appreciated by one of skill in the art in possession of the present disclosure, the symmetric running configuration above includes the unique EVPN router MAC address ("00:00:00:11:12:00") and the unique L3 VNI ("5000") generated using the asymmetric running configuration discussed above, and other symmetric running configurations may be generated for other VTEP devices using the unique EVPN router MAC address and the unique L3 VNI generated for those VTEP devices as well. However, while a specific example of the generation of symmetric IRB attributes for VTEP devices is described above, one of skill in the art in possession of the present disclosure will appreciate that symmetric IRB attributes may be generated for VTEP devices using a variety of techniques that will within the scope of the present disclosure as well. In a specific example, a symmetric running configuration may be provided for each VTEP device by providing a unique L3 VNI in each VRF instance, providing a route target (e.g., "route-target auto") within each VRF instance, and provided an EVPN router MAC address for each VTEP device.

The method may then proceed to decision block 406 where the method 400 proceeds depending on whether a networking device that is being migrated is aggregated or standalone. As discussed in further detail below, the configuration of a VTEP device with symmetric IRB attributes may differ depending on whether that VTEP device is a "standalone" VTEP device or a VTEP device that is aggregated with another VTEP device as part of an aggregated networking device subsystem. As discussed above, a network administrator or other user may have identified the type of each VTEP device in the networked system 200 as either a "standalone" VTEP device or an "aggregated" VTEP device, and thus in an embodiment of decision block 406, the migration engine 304 in the migration system 202/300 may identify VTEP device(s) for migration and determine the type of the VTEP device(s). However, while a specific example of determining whether VTEP device(s) are "standalone" or "aggregated" has been provided, one of skill in the art in possession of the present disclosure will appreciate that other techniques for determining whether VTEP device(s) that are being migrated are "standalone" or "aggregated" will fall within the scope of the present disclosure as well.

Figure 7A:
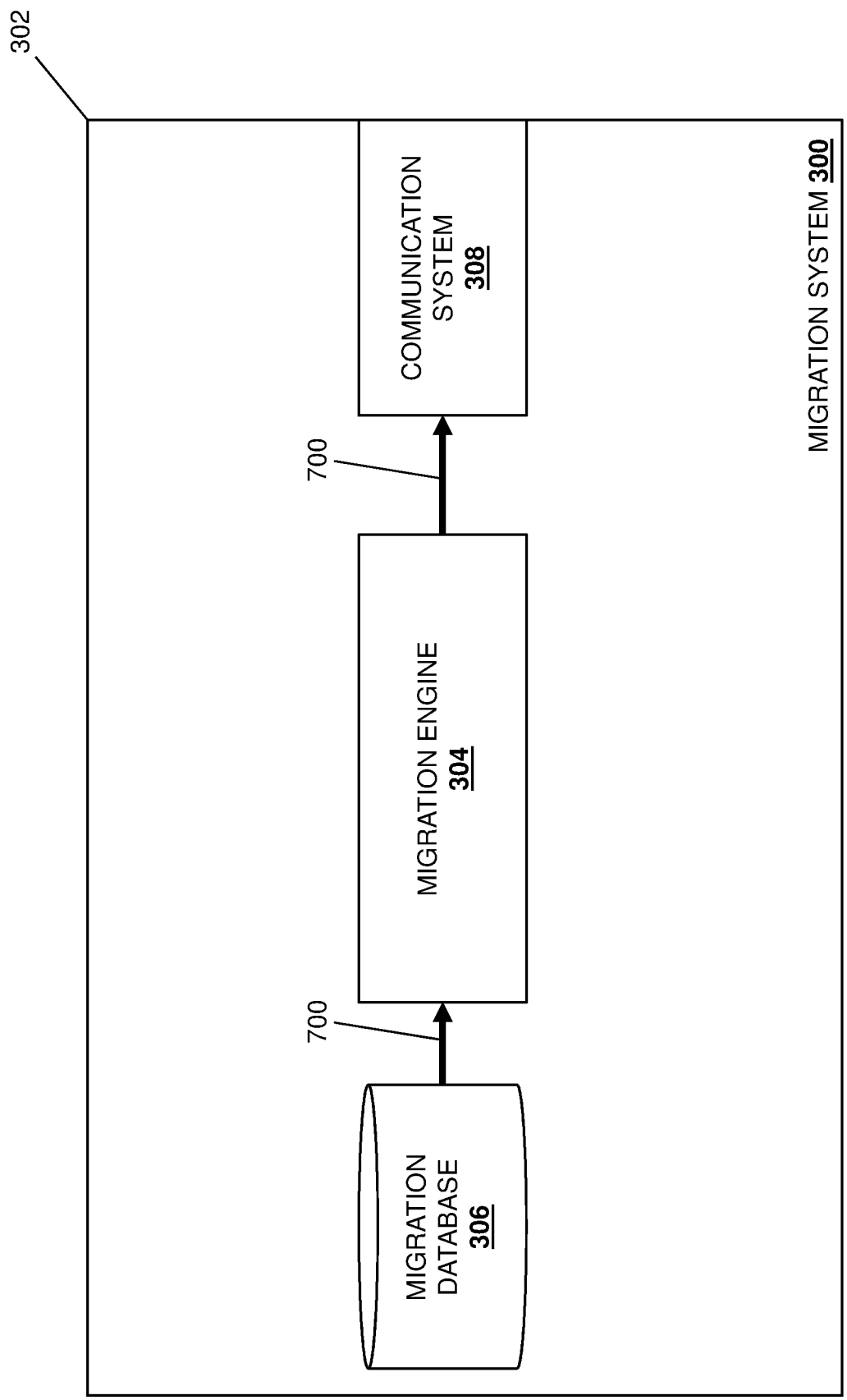
FIG. 7A is a schematic view illustrating an embodiment of the migration system of FIG. 3 operating during the method of FIG. 4.
Figure 7B:
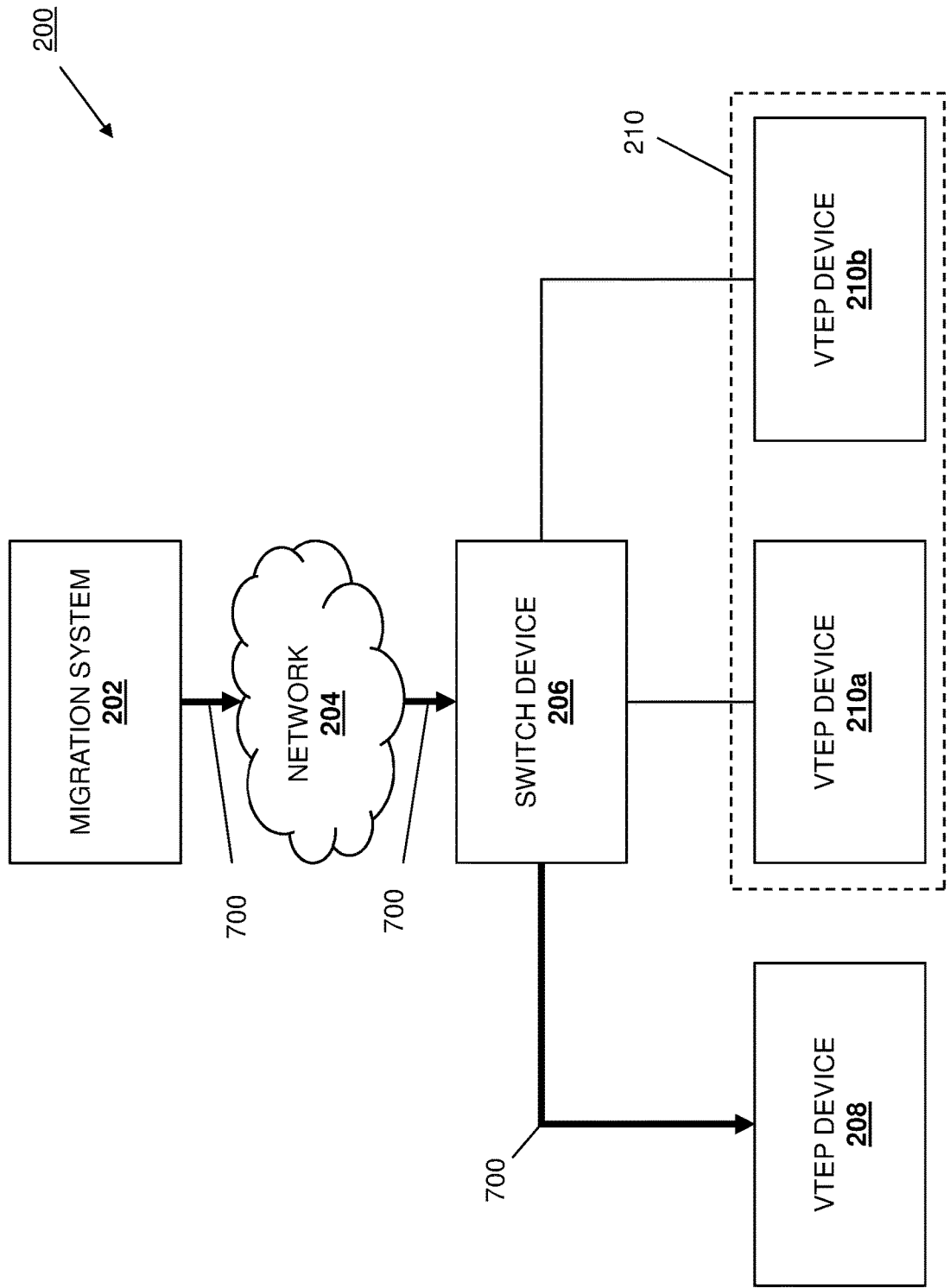
FIG. 7B is a schematic view illustrating an embodiment of the networked system of FIG. 2 operating during the method of FIG. 4.

If, at decision block 406, the networking device to migrate is standalone, the method 400 proceeds to block 408 where the migration system configures the standalone networking device with the symmetric IRB attributes generated for that networking device. In an embodiment, at decision block 406, the migration engine 304 in the migration system 202/300 may select the VTEP device 208 for migration and, in response, may determine that the VTEP device 208 is a "standalone" VTEP device and, as such, the method 400 will proceed to block 408. With reference to FIGS. 7A and 7B, in an embodiment of block 408, the migration engine 304 in the migration system 202/304 may then perform symmetric IRB attribution configuration operations 700 to configure the VTEP device 208 with the symmetric IRB attributes generated for that VTEP device 208 at block 404. Continuing with the specific example provided above, at block 408 the migration engine 304 in the migration system 202/304 may apply the symmetric running configuration discussed above to the VTEP device 208 that includes the unique EVPN router MAC address generated for that VTEP device 208, and one of skill in the art in possession of the present disclosure will appreciate how similar symmetric running configurations with unique EVPN router MAC addresses may be applied to other "standalone" VTEP devices in the networked system 200 in a similar manner while remaining within the scope of the present disclosure as well. In some embodiments, the configuration of "standalone" VTEP devices with symmetric running configurations may be performed "on-the-fly", or while that VTEP device is handling data traffic, while remaining within the scope of the present disclosure.

If, at decision block 406, the networking devices to migrate are aggregated, the method 400 proceeds to block 410 where the migration system causes data destined for an end host device coupled to an aggregated networking device subsystem to be transmitted only to a first aggregated networking device. In an embodiment, at decision block 406, the migration engine 304 in the migration system 202/300 may select the VTEP devices 210a and 210b for migration and, in response, may determine that the VTEP devices 210a and 210b are "aggregated" VTEP devices and, as such, the method 400 will proceed to block 410. In an embodiment, at block 410 in response to determining that the VTEP devices 210a and 210b being migrated are "aggregated", the migration engine 304 in the migration system 202/300 may select one of those aggregated VTEP devices for configuration using the symmetric IRB attributes generated for that VTEP device prior to the configuration of the other aggregated VTEP device.

For example, the selection of a first aggregated VTEP device for configuration prior to the second aggregated VTEP device may be based on a traffic distribution between those aggregated VTEP devices (e.g., whichever VTEP device has the highest traffic distribution on "orphan" ports and tunnels may be selected as the first aggregated VTEP device for configuration) and/or based on other factors that would be apparent to one of skill in the art in possession of the present disclosure. As will be appreciated by one of skill in the art in possession of the present disclosure, the selection of a first aggregated VTEP device for configuration prior to a second aggregated VTEP device may provide for an aggregated VTEP device migration order that operates to avoid congestion in the ICL(s) between those aggregated VTEP devices.

Figure 8A:
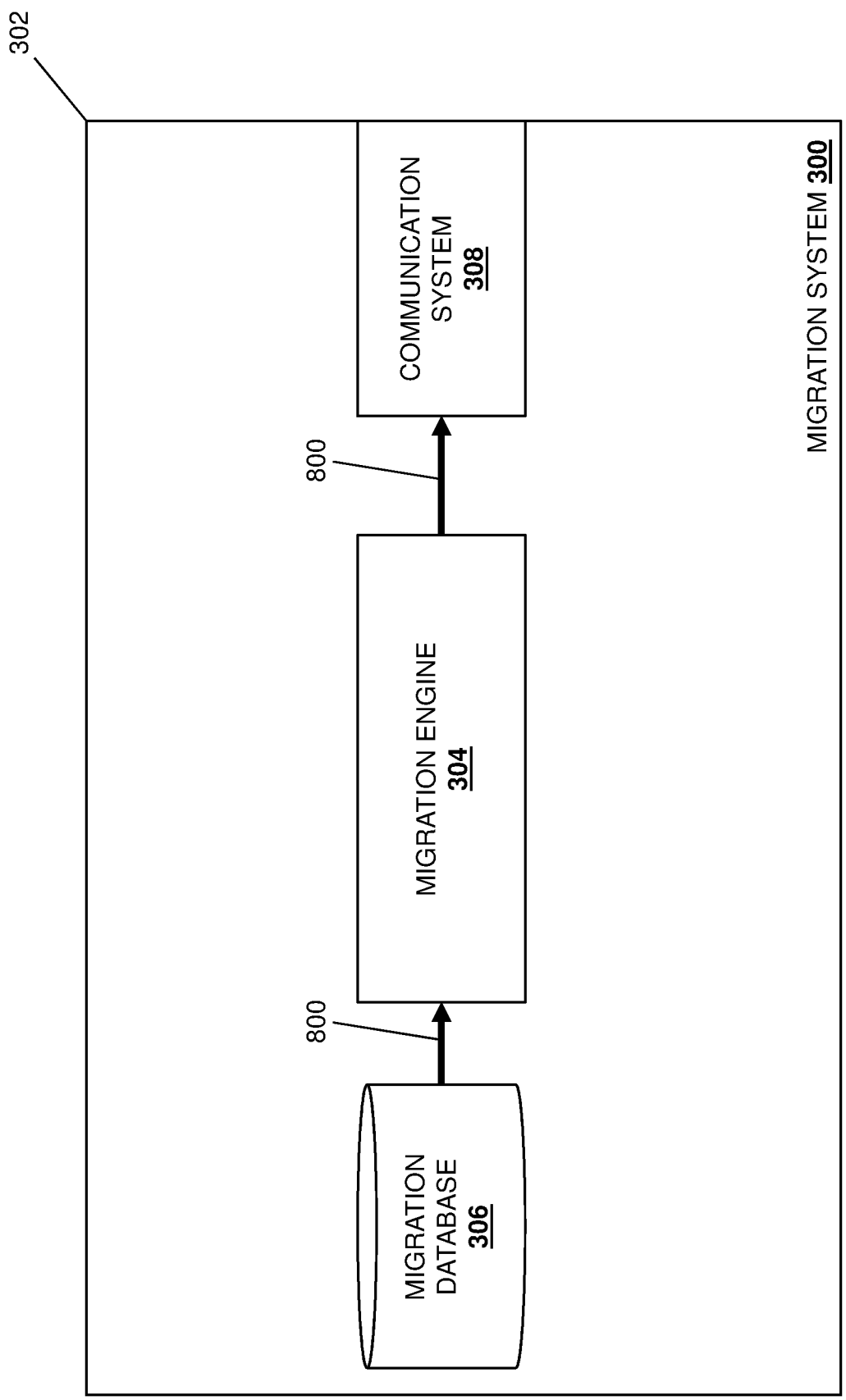
FIG. 8A is a schematic view illustrating an embodiment of the migration system of FIG. 3 operating during the method of FIG. 4.

In an embodiment, at block 410 and in response to selecting the VTEP device 210b for configuration prior to the VTEP device 210a, the migration engine 304 in the migration system 202/300 causes data destined for an end host device coupled to the aggregated networking device subsystem 210 to be transmitted only to the VTEP device 210b. With reference to FIGS. 8A and 8B, at block 410 and in response to selecting the VTEP device 210b for configuration prior to the VTEP device 210a, the migration engine 304 in the migration system 202/300 may perform BGP MED attribute configuration operations 800 in order to configure BGP MED attributes (also known as BGP "metrics") in the VTEP device 210a for addresses associated with the switch device 206 (e.g., spine switch device addresses), which one of skill in the art in possession of the present disclosure will recognize will cause data that is received by the switch device 206 and directed to end host devices that are coupled to the aggregated networking device subsystem 210 to be transmitted only to the VTEP device 210b.

In a specific example, block 410 may include the migration engine 304 in the migration system 202/300 configuring a route-map in the VTEP device 210a with a prefix-list in order to set a BGP metric associated with the VTEP IP address for the VTEP device 210a higher (i.e., relative to the VTEP IP address for the VTEP device 210b). An example of commands to provide such a configuration (utilizing values provided in the specific examples above) are reproduced below:

VTEP device 210a(config)#ip prefix-list vtep_ip seq 10 permit 90.90.90.90/32
VTEP device 210a(config)#route-map_set_higher_metric permit 10
VTEP device 210a(config-route-map)#match ip address prefix-list vtep_ip
VTEP device 210a(config-route-map)#continue 20
VTEP device 210a(config-route-map)#set metric 100
VTEP device 210a(config-route-map)#exit
VTEP device 210a(config-route-map)#set_higher_metric permit 20
VTEP device 210a(config-route-map)#exit Furthermore, block 410 may include the migration engine 304 in the migration system 202/300 configuring the route-map to the underlay BGP neighbors toward the switch device 206 (e.g., a spine switch device) so that data traffic is redirected towards the VTEP device 210b. An example of commands to provide such a configuration (utilizing values provided in the specific examples above) are reproduced below:

VTEP device 210a(config)#router bgp 200
VTEP device 210a(config-route-bgp-65100)#neighbor 34.34.34.34
VTEP device 210a(config-route-neighbor)#address-family ipv4 unicast
VTEP device 210a(config-route-bgp-neighbor-af)#route-map set_higher_metric out
VTEP device 210a(config-route-bgp-neighbor-af)#exit
VTEP device 210a(config-route-neighbor)#end However, while a specific technique has been described for causing data destined for an end host device coupled to an aggregated networking device subsystem to be transmitted only to one of the aggregated networking devices in that aggregated networking device subsystem, one of skill in the art in possession of the present disclosure will appreciate that other techniques will fall within the scope of the present disclosure as well.

Figure 8C:
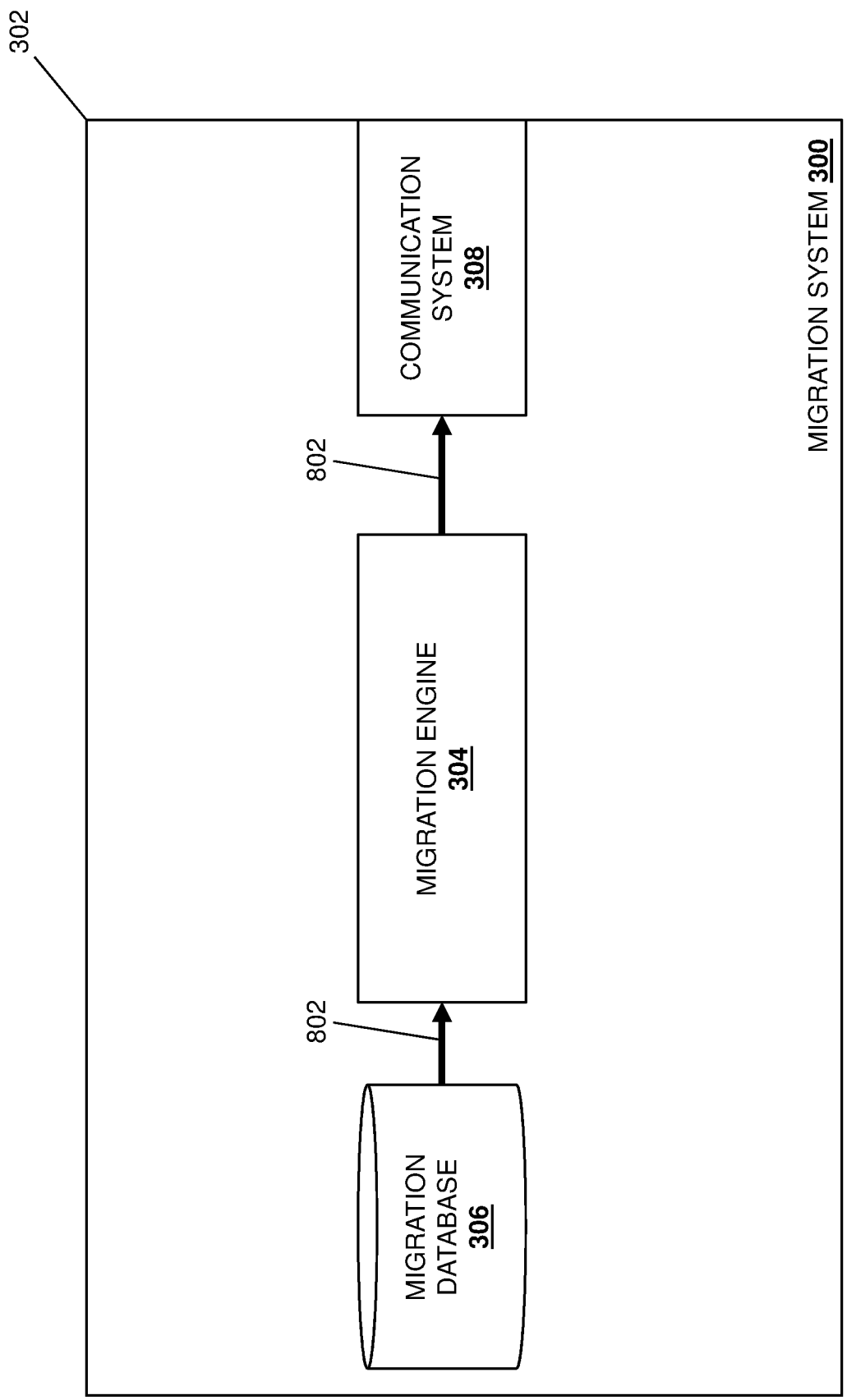
FIG. 8C is a schematic view illustrating an embodiment of the migration system of FIG. 3 operating during the method of FIG. 4.

The method 400 then proceeds to block 412 where the migration system configures a first aggregated networking device with the symmetric IRB attributes generated for that networking device. In an embodiment, at block 412, the migration engine 304 in the migration system 202/300 may operate to confirm data traffic convergence on the VTEP device 210b (e.g., as a result of the configuration of the BGP MED attributes in the VTEP device 210a in order to cause data received by the switch device 206 and directed to end host devices that are coupled to the aggregated networking device subsystem 210 to be transmitted only to the VTEP device 210b) prior to configuring the VTEP device 210b using the symmetric IRB attributes generated for that VTEP device 210b. With reference to FIGS. 8C and 8D, in an embodiment of block 412, the migration engine 304 in the migration system 202/304 may then perform symmetric IRB attribution configuration operations 802 to configure the VTEP device 210b with the symmetric IRB attributes generated for that VTEP device 210b at block 404. Continuing with the specific example provided above, at block 412 the migration engine 304 in the migration system 202/304 may apply the symmetric running configuration discussed above to the VTEP device 210b that includes the unique EVPN router MAC address and the unique L3 VNI generated for that VTEP device 210b.

Figure 8F:
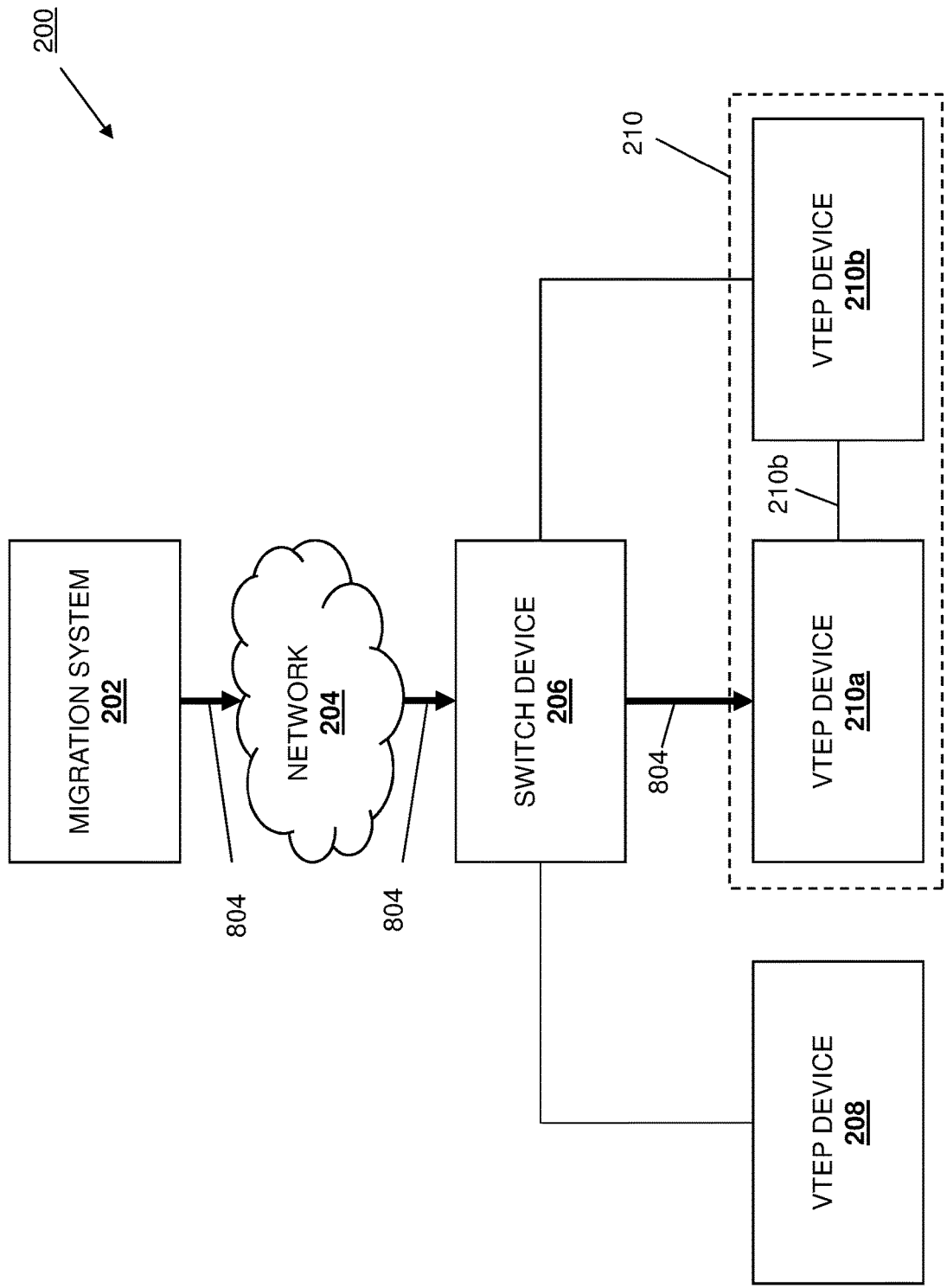
FIG. 8F is a schematic view illustrating an embodiment of the networked system of FIG. 2 operating during the method of FIG. 4.

The method 400 then proceeds to block 414 where the migration system configures a second aggregated networking device with the symmetric IRB attributes generated for that networking device. In an embodiment, at block 414 and subsequent to completing the configuration of the VTEP device 210b using the symmetric IRB attributes generated for that VTEP device 210b, the migration engine 304 in the migration system 202/300 may operate to configure the VTEP device 210a using the symmetric IRB attributes generated for that VTEP device 210a. With reference to FIGS. 8E and 8F, in an embodiment of block 412, the migration engine 304 in the migration system 202/304 may then perform symmetric IRB attribution configuration operations 804 to configure the VTEP device 210a with the symmetric IRB attributes generated for that VTEP device 210a at block 404. Continuing with the specific example provided above, at block 412 the migration engine 304 in the migration system 202/304 may apply the symmetric running configuration discussed above to the VTEP device 210a that includes the unique EVPN router MAC address and the unique L3 VNI generated for that VTEP device 210a.

As will be appreciated by one of skill in the art in possession of the present disclosure, the selection of the VTEP device 210b to handle all data traffic for the aggregated networking device subsystem 210, along with the configuration of that VTEP device 210b with its symmetric IRB attributes to migrate that VTEP device 210b to a symmetric IRB model prior to the configuration of the VTEP device 210a with its symmetric IRB attributes to migrate that VTEP device 210a to a symmetric IRB model, ensures that the VTEP device 210b that is handling the data traffic for the aggregated networking device subsystem 210 will be migrated to the symmetric IRB mode first, followed by the migration of the VTEP device 210a (which is not currently handling the data traffic for the aggregated networking device subsystem 210) to the symmetric IRB model. One of skill in the art in possession of the present disclosure will recognize that this migration order ensures that an aggregated VTEP device handling data traffic for an aggregated networking device subsystem will not operate according to the asymmetric IRB model while the other aggregated VTEP device operates according to the symmetric IRB model, which can result in the dropping of data traffic and/or other data losses.

The method 400 then proceeds to block 416 where the migration system causes data destined for an end host device coupled to the aggregated networking device subsystem to be transmitted to both the first aggregated networking device and the second aggregated networking device. With reference to FIGS. 8G and 8H, at block 416 and in response to migrating the VTEP devices 210a and 210b to the symmetric IRB model, the migration engine 304 in the migration system 202/300 may perform BGP MED attribute unconfiguration operations 806 in order to remove the BGP MED attributes/configuration that was provided at block 410 in the VTEP device 210a for addresses associated with the switch device 206 (e.g., spine switch device addresses), which one of skill in the art in possession of the present disclosure will recognize will cause data received by the switch device 206 and directed to end host devices that are coupled to the aggregated networking device subsystem 210 to be transmitted to both the VTEP devices 210a and 210b (e.g., the switch device 206 will restart the sending of overlay data traffic to the VTEP device 210a). In addition, at block 416 the migration engine 304 in the migration system 202/300 may audit and/or clean up any "stale" virtual interfaces, and subsequently monitor for data traffic convergence on the migrated aggregated VLT devices 210a and 210b.

However, while a specific technique has been described for causing data destined for an end host device coupled to an aggregated networking device subsystem to be transmitted both of the aggregated networking devices in that aggregated networking device subsystem, one of skill in the art in possession of the present disclosure will appreciate that other techniques will fall within the scope of the present disclosure as well. As discussed above, while migration operations have been described for the VTEP devices 210a and 210b in the aggregated networking device subsystem 210, similar operation may be performed for any aggregated networking device subsystem in the networked system 200. As such, "standalone" VTEP devices and "aggregated" VTEP devices may be automatically migrated from an asymmetric IRB model to a symmetric IRB model in order to automatically migrate the networked system 200/datacenter from the asymmetric IRB model to the symmetric IRB model.

Thus, systems and methods have been described that provide for the automated generation of symmetric IRB attributes for networking devices in a datacenter using asymmetric IRB attributes retrieved from those networking devices, along with the use of those with those symmetric IRB attributes to perform the sequential configuration of networking devices that are aggregated as part of an aggregated networking device subsystem while data traffic is directed to only one of those networking devices, in order to migrate the datacenter from an asymmetric IRB model to a symmetric IRB model. For example, the asymmetric/symmetric IRB migration system of the present disclosure may include an aggregated networking device subsystem with a first and second networking device that are both configured to operate according to an asymmetric IRB model. A migration system coupled to the aggregated networking device subsystem retrieves first and second asymmetric IRB attributes from the first and second networking devices, uses the first asymmetric IRB attributes to generate first symmetric IRB attributes for the first networking device, and uses the second asymmetric IRB attributes to generate second symmetric IRB attributes for the second networking device. The migration system then causes data destined for end host device(s) coupled to the aggregated networking device subsystem to be transmitted only to the first networking device, configures the first networking device using the first symmetric IRB attributes, and then configures the second networking device using the second symmetric IRB attributes. As such, the migration of datacenters from an asymmetric IRB model to a symmetric IRB model is automated, reducing the manual, time-consuming, and error prone operations required in conventional asymmetric/symmetric IRB migration systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An asymmetric/symmetric Integrated Routing Bridging (IRB) migration system, comprising:
    an aggregated networking device subsystem including:
        a first networking device that is configured to operate according to an asymmetric Integrated Routing Bridging (IRB) model; and
        a second networking device that is configured to operate according to the asymmetric IRB model; and
    a migration system that is coupled to the aggregated networking device subsystem, wherein the migration system is configured to:
        retrieve first asymmetric IRB attributes from the first networking device;
        retrieve second asymmetric IRB attributes from the second networking device;
        generate, using the first asymmetric IRB attributes, first symmetric IRB attributes for the first networking device;
        generate, using the second asymmetric IRB attributes, second symmetric IRB attributes for the second networking device;
        cause data destined for at least one end host device that is coupled to the aggregated networking device subsystem to be transmitted only to the first networking device;
        configure the first networking device using the first symmetric IRB attributes; and
        configure, subsequent to configuring the first networking device using the first symmetric IRB attributes, the second networking device using the second symmetric IRB attributes.

2. The system of claim 1, wherein the migration system is configured to:
    cause, subsequent to configuring the second networking device using the second symmetric IRB attributes, data destined for the at least one end host device that is coupled to the aggregated networking device subsystem to be transmitted to both the first networking device and the second networking device.

3. The system of claim 1, wherein the first asymmetric IRB attributes include at least one first Virtual Routing and Forwarding (VRF) instance associated with the first networking device, at least one first tunnel source Internet Protocol (IP) address associated with the first networking device, at least one first Border Gateway Protocol (BGP) underlay switch neighbor associated with the first networking device, and at least one first BGP Autonomous System (AS) associated with the first networking device, and wherein the second asymmetric IRB attributes include at least one second VRF instance associated with the second networking device, at least one second tunnel source IP address associated with the second networking device, at least one second BGP underlay switch neighbor associated with the second networking device, and at least one second BGP AS associated with the second networking device.

4. The system of claim 3, wherein the first symmetric IRB attributes include a unique first Layer 3 (L3) Virtual eXtensible Local Area Network (VXLAN) Network Identifier (VNI) for each at least one first VRF instance, the second symmetric IRB attributes include a unique second L3 VNI for each at least one second VRF instance, and the first symmetric IRB attributes and the second symmetric IRB attributes include a unique Ethernet Virtual Private Network (EVPN) router Media Access Control (MAC) address for the aggregated networking device subsystem.

5. The system of claim 1, wherein the migration system is configured to cause data destined for the at least one end host device that is coupled to the aggregated networking device subsystem to be transmitted only to the first networking device by:

configuring at least one Border Gateway Protocol (BGP) Multi-Exit Discriminator (MED) attribute in the second networking device.

6. The system of claim 1, wherein the migration system is configured to:

confirm data traffic convergence on the first networking device prior to configuring the first networking device using the first symmetric IRB attributes.

7. An Information Handling System (IHS), comprising:
a processing system; and
a memory system that is coupled to the processing system and that includes instructions that, when executed by the processing system, cause the processing system to provide a migration engine that is configured to:
retrieve first asymmetric Integrated Routing Bridging (IRB) attributes from a first networking device;
retrieve second asymmetric IRB attributes from the second networking device that is aggregated with the first networking device to provide an aggregated networking device subsystem;
generate, using the first asymmetric IRB attributes, first symmetric IRB attributes for the first networking device;
generate, using the second asymmetric IRB attributes, second symmetric IRB attributes for the second networking device;
cause data destined for at least one end host device that is coupled to the aggregated networking device subsystem to be transmitted only to the first networking device;
configure the first networking device using the first symmetric IRB attributes; and
configure, subsequent to configuring the first networking device using the first symmetric IRB attributes, the second networking device using the second symmetric IRB attributes.

8. The IHS of claim 7, wherein the migration engine is configured to:

cause, subsequent to configuring the second networking device using the second symmetric IRB attributes, data destined for the at least one end host device that is coupled to the aggregated networking device subsystem to be transmitted to both the first networking device and the second networking device.

9. The IHS of claim 7, wherein the first asymmetric IRB attributes include at least one first Virtual Routing and Forwarding (VRF) instance associated with the first networking device, at least one first tunnel source Internet Protocol (IP) address associated with the first networking device, at least one first Border Gateway Protocol (BGP) underlay switch neighbor associated with the first networking device, and at least one first BGP Autonomous System (AS) associated with the first networking device, and wherein the second asymmetric IRB attributes include at least one second VRF instance associated with the second networking device, at least one second tunnel source IP address associated with the second networking device, at least one second BGP underlay switch neighbor associated with the second networking device, and at least one second BGP AS associated with the second networking device.

10. The IHS of claim 9, wherein the first symmetric IRB attributes include a unique first Layer 3 (L3) Virtual eXtensible Local Area Network (VXLAN) Network Identifier (VNI) for each at least one first VRF instance, the second symmetric IRB attributes include a unique second L3 VNI for each at least one second VRF instance, and the first symmetric IRB attributes and the second symmetric IRB attributes include a unique Ethernet Virtual Private Network (EVPN) router Media Access Control (MAC) address for the aggregated networking device subsystem.

11. The IHS of claim 7, wherein the migration engine is configured to cause data destined for the at least one end host device that is coupled to the aggregated networking device subsystem to be transmitted only to the first networking device by:

configuring at least one Border Gateway Protocol (BGP) Multi-Exit Discriminator (MED) attribute in the second networking device.

12. The IHS of claim 7, wherein the migration engine is configured to:

confirm data traffic convergence on the first networking device prior to configuring the first networking device using the first symmetric IRB attributes.

13. The IHS of claim 7, wherein the migration engine is configured to:

select the first networking device for configuration using the first symmetric IRB attributes prior to the configuration of the second networking device using the second symmetric IRB attributes based on at least one of:
a traffic distribution between the first networking device and the second networking device; or
an end host device distribution between the first networking device and the second networking device.

14. A method for migrating from an asymmetric Integrated Routing Bridging (IRB) model to a symmetric IRB model, comprising:

retrieving, by a migration system, first asymmetric Integrated Routing Bridging (IRB) attributes from a first networking device;
retrieving, by the migration system, second asymmetric IRB attributes from the second networking device that is aggregated with the first networking device to provide an aggregated networking device subsystem;

generating, by the migration system using the first asymmetric IRB attributes, first symmetric IRB attributes for the first networking device;

generating, by the migration system using the second asymmetric IRB attributes, second symmetric IRB attributes for the second networking device;

causing, by the migration system, data destined for at least one end host device that is coupled to the aggregated networking device subsystem to be transmitted only to the first networking device;

configuring, by the migration system, the first networking device using the first symmetric IRB attributes; and configuring, by the migration system subsequent to configuring the first networking device using the first symmetric IRB attributes, the second networking device using the second symmetric IRB attributes.

15. The method of claim 14, further comprising:

causing, by the migration system subsequent to configuring the second networking device using the second symmetric IRB attributes, data destined for the at least one end host device that is coupled to the aggregated networking device subsystem to be transmitted to both the first networking device and the second networking device.

16. The method of claim 14, wherein the first asymmetric IRB attributes include at least one first Virtual Routing and Forwarding (VRF) instance associated with the first networking device, at least one first tunnel source Internet Protocol (IP) address associated with the first networking device, at least one first Border Gateway Protocol (BGP) underlay switch neighbor associated with the first networking device, and at least one first BGP Autonomous System (AS) associated with the first networking device, and wherein the second asymmetric IRB attributes include at least one second VRF instance associated with the second networking device, at least one second tunnel source IP address associated with the second networking device, at least one second BGP underlay switch neighbor associated with the second networking device, and at least one second BGP AS associated with the second networking device.

17. The method of claim 16, wherein the first symmetric IRB attributes include a unique first Layer 3 (L3) Virtual eXtensible Local Area Network (VXLAN) Network Identifier (VNI) for each at least one first VRF instance, the second symmetric IRB attributes include a unique second L3 VNI for each at least one second VRF instance, and the first symmetric IRB attributes and the second symmetric IRB attributes include a unique Ethernet Virtual Private Network (EVPN) router Media Access Control (MAC) address for the aggregated networking device subsystem.

18. The method of claim 14, wherein the causing data destined for the at least one end host device that is coupled to the aggregated networking device subsystem to be transmitted only to the first networking device including:

configuring, by the migration system, at least one Border Gateway Protocol (BGP) Multi-Exit Discriminator (MED) attribute in the second networking device.

19. The method of claim 14, further comprising:

confirming, by the migration system, data traffic convergence on the first networking device prior to configuring the first networking device using the first symmetric IRB attributes.

20. The method of claim 14, further comprising:

selecting, by the migration system, the first networking device for configuration using the first symmetric IRB attributes prior to the configuration of the second networking device using the second symmetric IRB attributes based on at least one of:

a traffic distribution between the first networking device and the second networking device; or an end host device distribution between the first networking device and the second networking device.

* * * * *